(12) United States Patent
Mendoza

(10) Patent No.: US 6,830,466 B2
(45) Date of Patent: Dec. 14, 2004

(54) CROSS AISLE CONNECTION PANEL WITH MOVABLE CABLE BRACKETS

(75) Inventor: Jose-Filonel T. Mendoza, Brooklyn Center, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 365 days.

(21) Appl. No.: 09/905,720

(22) Filed: Apr. 27, 2001

(65) Prior Publication Data

US 2002/0160660 A1 Oct. 31, 2002

(51) Int. Cl.[7] .............................................. H01R 13/44
(52) U.S. Cl. ...................................... 439/136; 439/142
(58) Field of Search ................................ 439/136, 138, 439/142, 145, 367, 540.1, 534

(56) References Cited

U.S. PATENT DOCUMENTS

| | | | |
|---|---|---|---|
| 2,896,009 A | | 7/1959 | Caveney |
| 3,764,857 A | * | 10/1973 | Bartlett et al. ............... 361/681 |
| 4,307,438 A | * | 12/1981 | Grubb .......................... 361/788 |
| 4,603,377 A | | 7/1986 | Kobayashi et al. |
| 4,665,546 A | | 5/1987 | Brey et al. |
| 5,023,404 A | | 6/1991 | Hudson et al. |
| 5,220,600 A | | 6/1993 | Chouanard et al. |
| 5,326,934 A | | 7/1994 | LeMaster et al. |

(List continued on next page.)

FOREIGN PATENT DOCUMENTS

| | | |
|---|---|---|
| DE | 93 02 456.8 | 5/1993 |
| FR | 2 446 040 | 8/1980 |
| WO | WO 98/35175 | 8/1998 |
| WO | WO 00/72646 A2 | 11/2000 |

OTHER PUBLICATIONS

ADC Telecommunications Doc. 234, "Digital Distribution Frame Products", pp. 1–16, (Mar. 1992).
ADC Telecommunications Doc. 274, "Digital Signal Cross–Connect (DSX–3), Front and Rear Cross–Connect Products", front cover, table of contents, pp. 1–71, rear cover, (Feb. 1999).
ADC Telecommunications Doc. 261, "DSX–1 Digital Signal Cross–Connect, Modules, Panels and Accessories", front cover, table of contents, pp. 1–34, rear cover, (Jul. 1998).
ADC Telecommunications Doc. 256, "DSX–1 Digital Signal Cross–Connect, Rack Framework and Accessories", 6th Ed., front cover, table of contents, pp. 1–81, rear cover, (May 1998).

(List continued on next page.)

Primary Examiner—Chandrika Prasad
(74) Attorney, Agent, or Firm—Merchant & Gould PC

(57) ABSTRACT

The present invention relates to telecommunications equipment racks including vertical cable guides, horizontal troughs, cross aisle panels and cross-connection modules for telecommunications equipment racks. The vertical cable guides define vertical cable channels for both network infrastructure and cross-connection cables. The structure defining the second cable channel is hingedly attached to the structure defining the first cable channel. The horizontal cable troughs include both upper and lower troughs. The upper cable trough defines two cableways for directing cross-connection and other cables, and provides access openings for cables to pass into and out of each cableway and between the two cableways. The lower cable trough defines a cableway and provides access openings for cables extending into and out of the cableway. Cable troughs attached to adjacently mounted equipment racks cooperate to form continuous horizontal cableways. The cross aisle panel includes movable cable guide structures to permit access to connectors mounted on the panel. The cross-connection modules provide multiple connector planes on the rear of the module to increase the number of circuits the module can support.

6 Claims, 39 Drawing Sheets

U.S. PATENT DOCUMENTS

| | | | |
|---|---|---|---|
| RE34,955 | E | 5/1995 | Anton et al. |
| 5,497,444 | A | 3/1996 | Wheeler |
| 5,586,012 | A | 12/1996 | Lerman |
| 5,683,001 | A | 11/1997 | Masuda et al. |
| 5,758,003 | A | 5/1998 | Wheeler et al. |
| 5,765,698 | A | 6/1998 | Bullivant |
| 5,788,087 | A | 8/1998 | Orlando |
| 5,819,956 | A | 10/1998 | Rinderer |
| 5,867,372 | A | 2/1999 | Shie |
| 5,921,402 | A | 7/1999 | Magenheimer |
| 5,989,074 | A * | 11/1999 | Miller et al. ............... 439/709 |
| 6,045,398 | A * | 4/2000 | Narita et al. ............... 439/500 |
| 6,102,214 | A | 8/2000 | Mendoza |
| 6,132,242 | A * | 10/2000 | Hall et al. ............... 439/532 |
| 6,223,909 | B1 | 5/2001 | Mendoza |
| 6,336,814 | B1 * | 1/2002 | Kusyk et al. ............... 439/61 |
| 6,430,053 | B1 * | 8/2002 | Peterson et al. ............ 361/728 |
| 6,527,597 | B1 * | 3/2003 | Harper, Jr. ............... 439/701 |

OTHER PUBLICATIONS

ADC Telecommunications Doc. 804, "Fiber Cable Management Products", Second Edition, front cover, table of contents, pp. 1–144, rear cover, (Oct. 1995).

ADC Telecommunications Doc. 803, "FL2000 Products", front cover, table of contents, pp. 1–48, rear cover, (Nov. 1996).

ADC Telecommunications Doc. 272, "Mini DSX–3 Products", front cover, table of contents, pp. 1–35, rear cover, (Jun. 1997).

ADC Telecommunications Doc. 820, "Next Generation Frame (NGF), Product Family Ordering Guide", front cover, table of contents, pp. 1–21, rear cover, (Oct. 1998).

ADC Telecommunications "Global Copper Cable Management Planning Guide", pp. 1–66, (© 2000).

ADC Telecommunications Doc. 298, "RZX–3 Products", front cover, table of contents, pp. 1–29, rear cover, (Sep. 2000).

ADC Telecommunications Doc. 261, "DSX–1 Digital Signal Cross–Connect, Rack Framework and Accessories", 7th Ed., front cover, table of contents, pp. 1–35, rear cover, (Aug. 2000).

ADC Telecommunications Doc. 256, "DSX–1 Modules and Panels", front cover, table of contents, pp. 1–58, rear cover, (May 2000).

ADC Telecommunications Doc. 207, "DSX–600™" E1 Super High Density Solutions, 5 pages, rear cover, (Jun. 1999).

ADC Telecommunications Doc. 215, "DSX–600™" E1 DSX Front Cross–Connect Solutions, 7 pages, rear cover, (Jun. 1999).

* cited by examiner

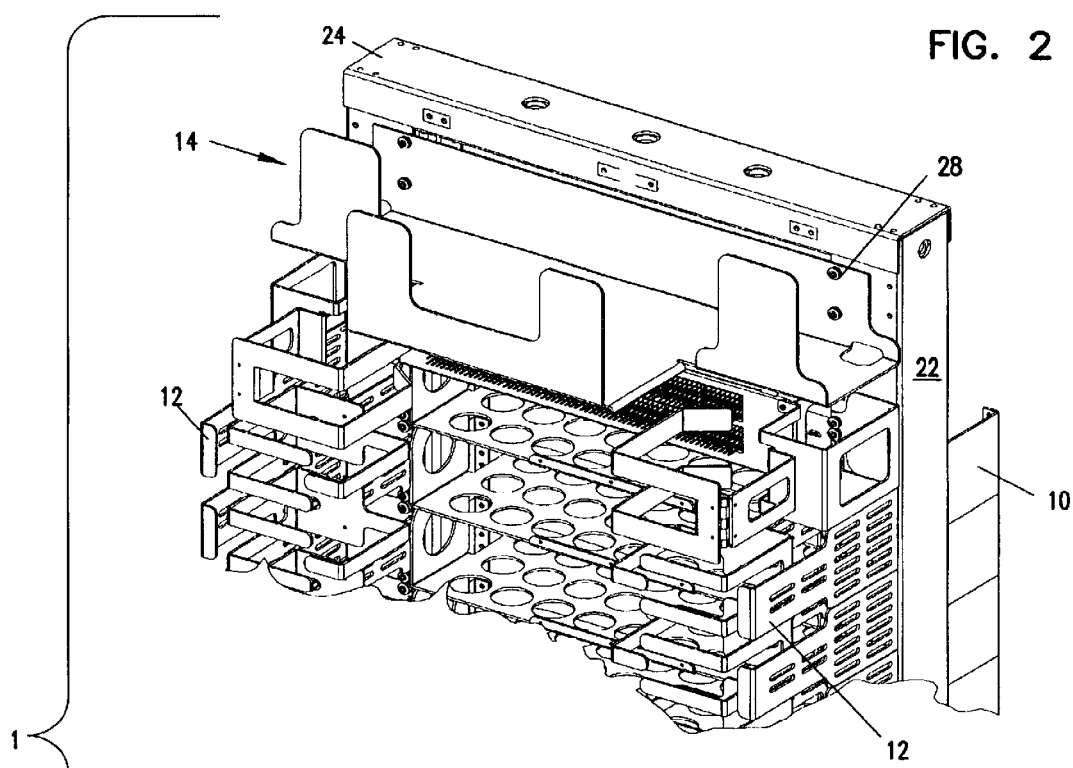
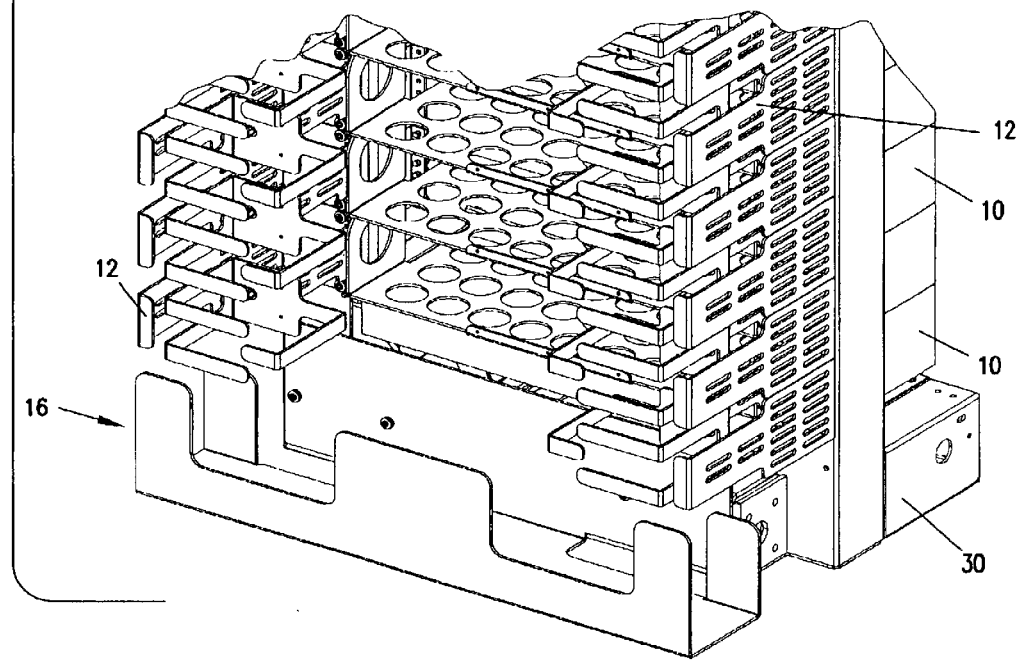
FIG. 2

FIG. 4

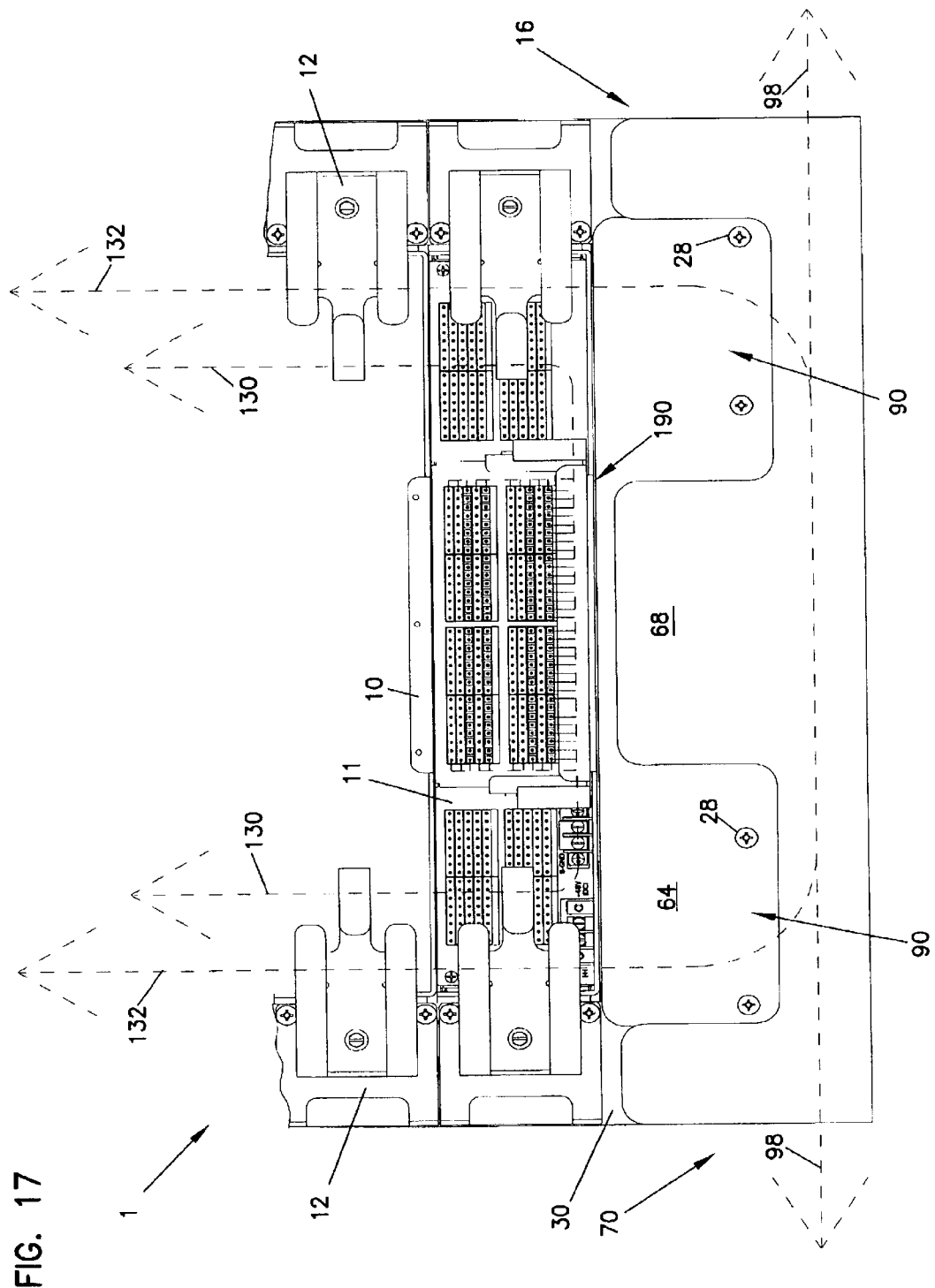

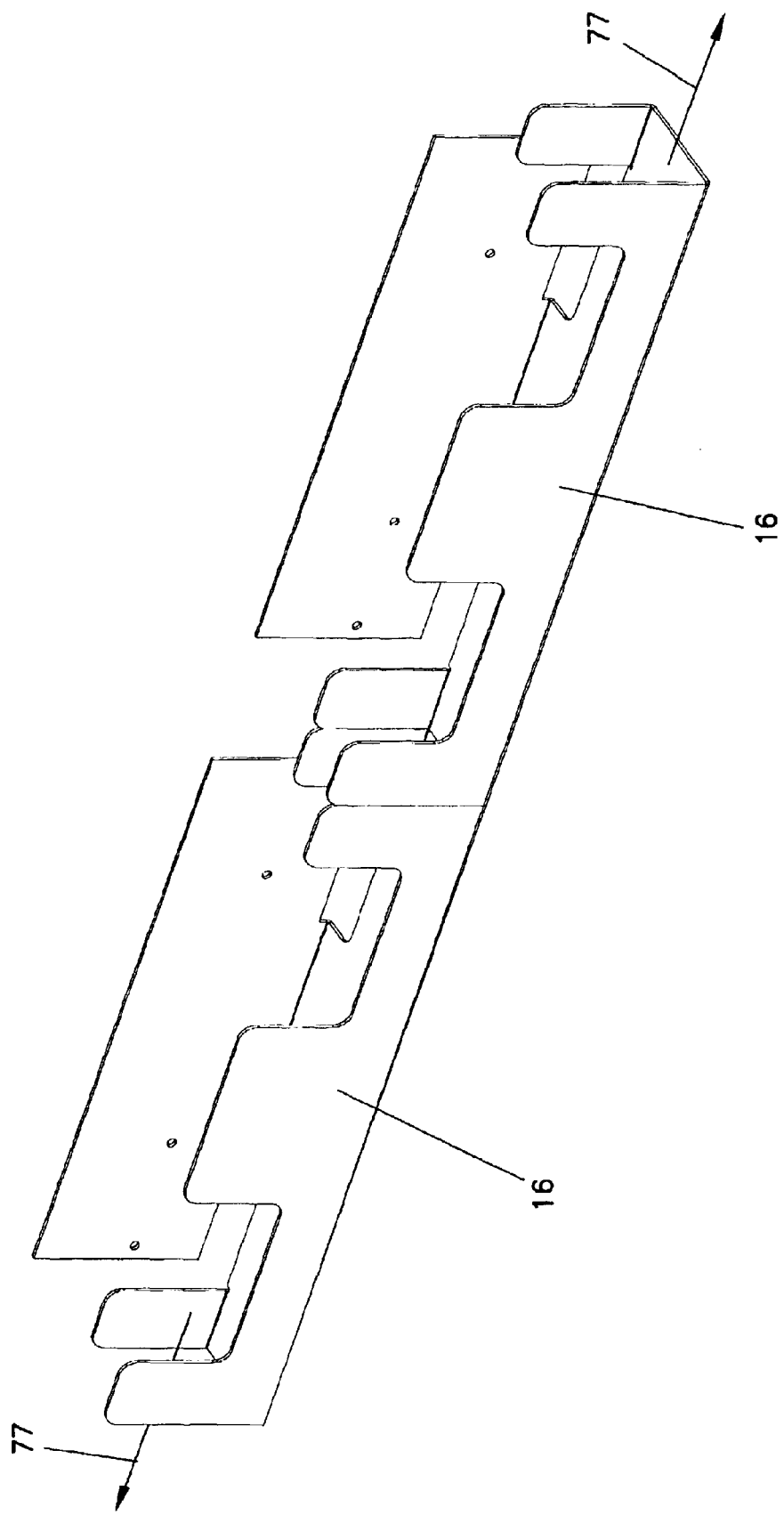

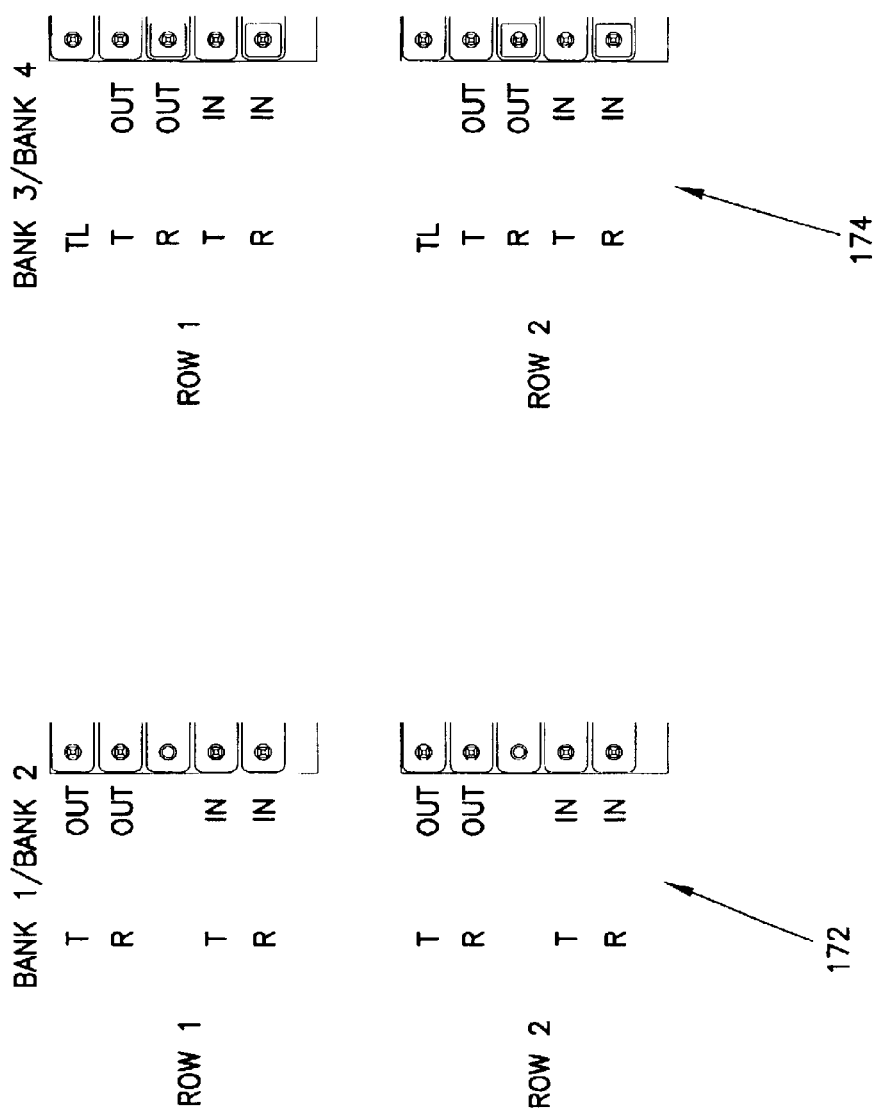

CROSS AISLE CONNECTION PANEL WITH MOVABLE CABLE BRACKETS

FIELD OF THE INVENTION

The present invention relates to cable management. More specifically, the present invention relates to cable management structures for use with electronic equipment racks.

BACKGROUND OF THE INVENTION

In the telecommunications industry, electronic equipment is housed in a series of equipment racks to permit higher densities of connections per unit of floor space. Installing a large number of connections in an equipment rack is efficient with respect to floor space but places a premium on the ability to manage and maintain the cables leading to and away from these equipment racks. A telecommunications installation might have outside plant or network infrastructure cables connected to switching equipment housed in a series of telecommunications equipment racks, local distribution cables connected to the same switching equipment in the racks, and patch cords and cross-connect jumpers linking the switching equipment. The switching equipment being connected can be located within the same rack, in adjacent racks, in racks within the same linear row or aisle, or in racks in different aisles. In addition, electrical power and thus power cables must be supplied to the switching equipment. All of these cables must be provided with paths or cable management structures within the equipment racks and between the equipment racks.

These network infrastructure, patch, jumper and power cables share the available cable management structures within a telecommunications installation. For dense installations, it is desirable to provide some manner of grouping like cables together to improve maintenance and operational efficiency. For instance, cross-connect cables and network infrastructure cables may share the same vertical path on an equipment rack. The cross-connect cables are accessed and moved much more frequently than the network interface cables. Therefore, some way of grouping and segregating these cables within the same vertical cable path is desirable.

In addition, segregation and separation of cross-connect cables is also desirable. Some cross-connect cables link devices on the same rack while other cross-connect cables link equipment on separate racks. The racks within a particular telecommunications installation will have a series of horizontal paths or troughs which serve both types of cross-connect cables. For improved operational and maintenance efficiency, some apparatus for organizing and segregating these cross-connect cables as intra-rack and inter-rack should be provided. Other improvements to these troughs to provide better access to and visibility of the cables in the troughs, and to allow easier entry and exit of cables to the troughs, are also desirable.

There is an ever-increasing demand for additional telecommunications connections within existing installations. It is desirable to supply these connections within the same physical racks and wiring closets. Devices which allow switching and connection modules of higher levels of connection density are desirable. In addition, in a telecommunications equipment rack, it is desirable to have some ability to store small tools and equipment as well as additional patch cords for cross-connecting circuits. This will allow minor tasks, such as switching and small repairs to be done at that rack with materials close at hand. However, the provision of such a storage area should not detract from the number of circuits that a telecommunications rack can supply.

SUMMARY OF THE INVENTION

The present invention relates to electronic equipment racks which provide a higher density of connections within a given floor space, provide improved cable management structures, and provide storage of tools and cables on the rack itself without sacrificing connection space.

A first aspect of the present invention relates to cable guides including first and second ring structures which define first and second vertical cable channels, respectively. The second ring structure is hingedly mounted to the first ring structure and moves from a position closing access to the first channel and a second position allowing access to the first cable channel. A further aspect of the present invention relates to the use of cable guides on a telecommunications equipment rack to define vertical cable channels for managing cables extending from equipment attached to the rack. A further aspect of the present invention relates to a method of inserting cables into vertical cable channels defined by cable guides.

A further aspect of the invention relates to cable troughs having a mounting wall, a bottom and two outer walls, with cable access openings in the bottom. One embodiment of these cable troughs defines two horizontal cableways, between the mounting wall and the first outer wall and between the first outer wall and the second outer wall. Access is provided into both cableways through openings in the bottom and an opening allowing cables to move from one cableway into the other cableway is provided in the first inner wall. A second embodiment of the cable troughs defines a single cableway between the first and second outer walls and provides access to the cableway through an opening in the bottom and an opening in the first outer wall. A further aspect of the present invention relates to the use of cable troughs to define upper and lower horizontal cable troughs on a telecommunications equipment rack. A further aspect of the present invention relates to a method of managing cables extending from equipment mounted in a telecommunications equipment rack using horizontal cable troughs. A further aspect of the present invention relates to an electronic equipment rack with a storage drawer attached, wherein the storage drawer is mounted in the lowest position on the rack.

A further aspect of the invention relates to cross aisle connection panels and ring structures attached to cross aisle panels defining vertical cable channels. A further aspect of the present invention relates to the installation of cross aisle panels near the top of telecommunications equipment racks where the ring structures cooperate with cable guides to form vertical cable channels.

A further aspect of the invention relates to cross-connect modules for connecting telecommunications equipment. These cross-connect modules include a front mounted jack field and rear connections mounted on several connector planes, the connector planes being offset horizontally from each other. A further aspect of the present invention relates to a cross-connect module having three sections, with each section having a different width, a jack field on the front of the first section and rear connectors being mounted to the rear of the second and third sections. A further aspect of the present invention relates to a telecommunications rack with a cross-connect module installed, the cross-connect module having three sections, with each section having a different width, a jack field on the front of the first section and rear connectors being mounted to the rear of the second and third sections. A further aspect of the present invention relates to a cross-connect cable tray attached to the rear of a cross-connect module and removable from the module without tools.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 2 is an enlarged rear perspective view of the upper and lower portions of the telecommunications rack of FIG. 1.

Figure 4:
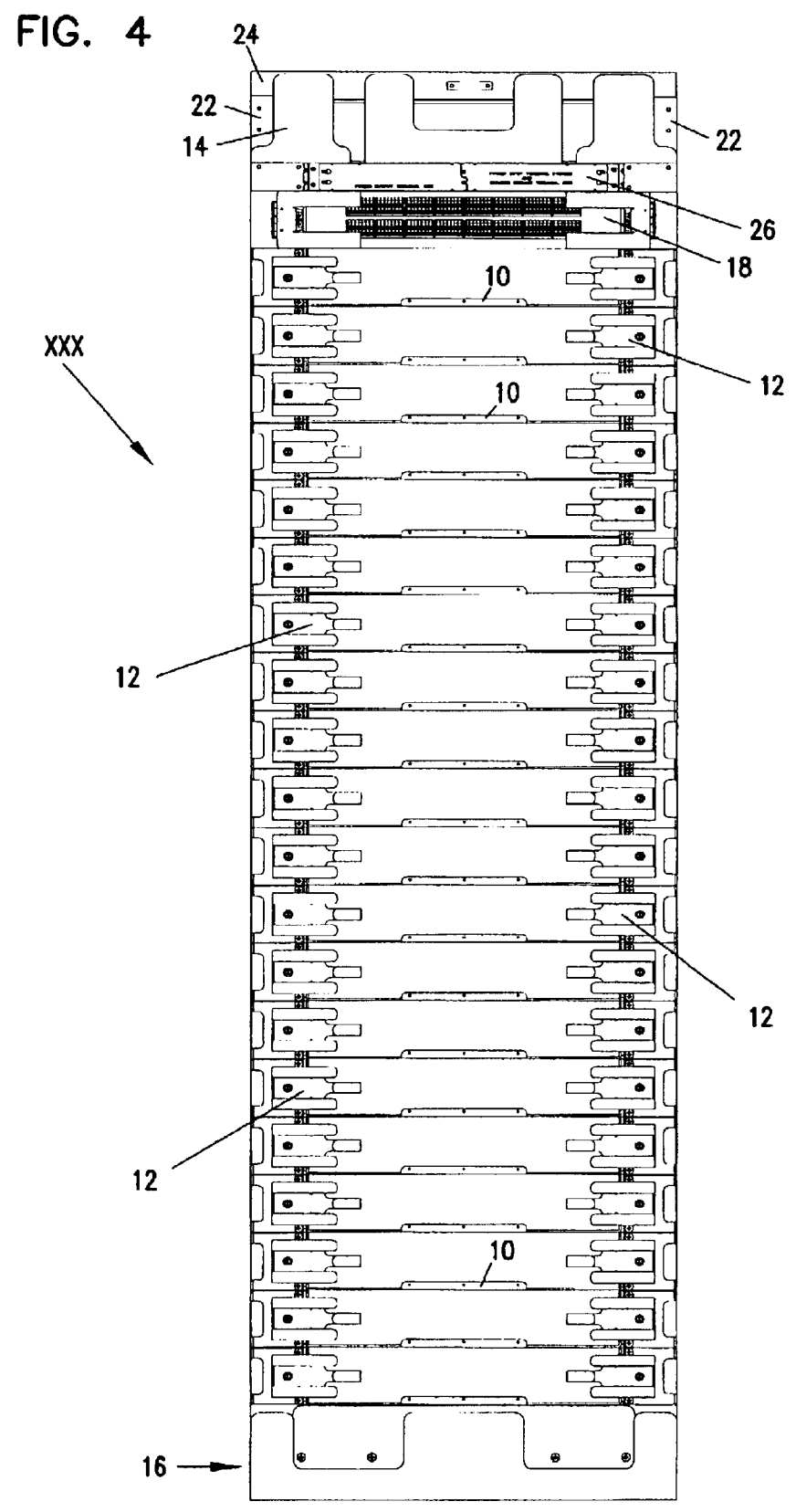

FIG. 4 is a rear view of the telecommunications rack of FIG. 1.

FIG. 17 is a rear view of the lower portion of the telecommunications rack of FIG. 1 with a cross-connect module installed.

FIG. 17A is a rear perspective view of two lower cable troughs mounted adjacent to one another forming a continuous cableway.

FIG. 20A is a diagram of the layout of the connectors on the rear of the telecommunications cross-connect module of FIG. 20.

DETAILED DESCRIPTION

Figure 1:
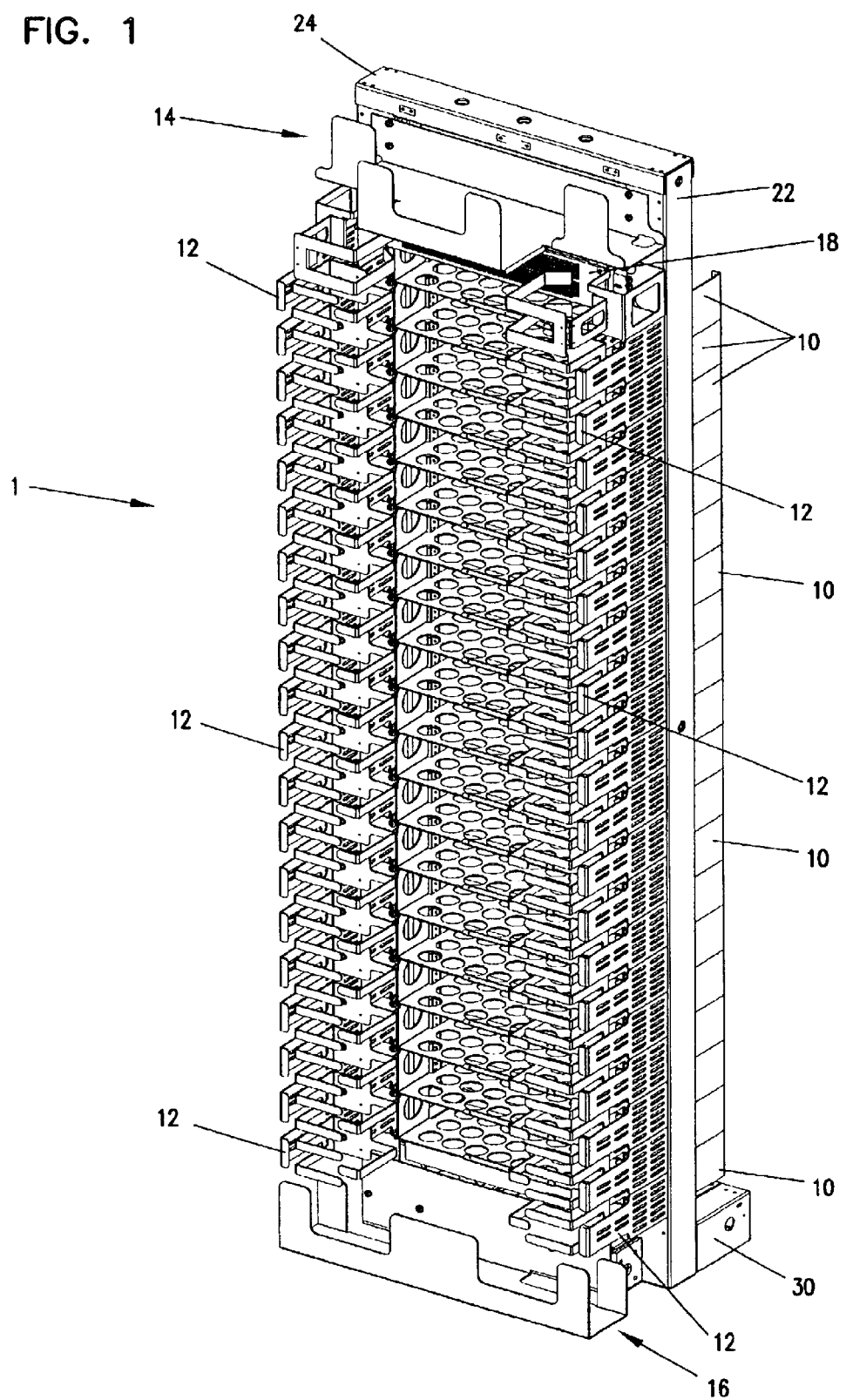
FIG. 1 is a rear perspective view of an embodiment of a telecommunications rack in accordance with the present invention.

Reference will now be made in detail to exemplary aspects of the present invention that are illustrated in the accompanying drawings. Where ever possible, the same reference numbers will be used throughout the drawings to refer to the same or like parts.

The present invention relates to equipment racks for mounting telecommunications equipment and providing pathways for cables extending to and from the equipment mounted in the racks. Equipment racks of this type may be included in installations with multiple racks installed in several rows to provide a very dense telecommunications environment capable of supporting many connections. The invention described herein improves the usability of the telecommunications equipment racks in very dense installations without hindering the suitability of the same racks for smaller, less dense and less complex installations.

Referring now to the FIGS., features of the present invention will be detailed. FIGS. 1 through 8 show an equipment rack or bay 1 for mounting telecommunications connection and switching equipment modules. Mounted to rack 1 are module mounts 10 for receiving equipment modules, such as cross-connect modules (FIG. 19) for cross-connecting cables and equipment linked to the cables. Rack 1 also includes vertical cable guides 12, mounted adjacent to each module mount 10 and on each side of rack 1, an upper cable trough 14 and a lower cable trough 16. At the top of rack 1 are a cross-aisle connection panel 18 and a power distribution panel 26. At the bottom of rack 1 is a drawer 44 which opens toward the front of rack 1.

Figure 3:
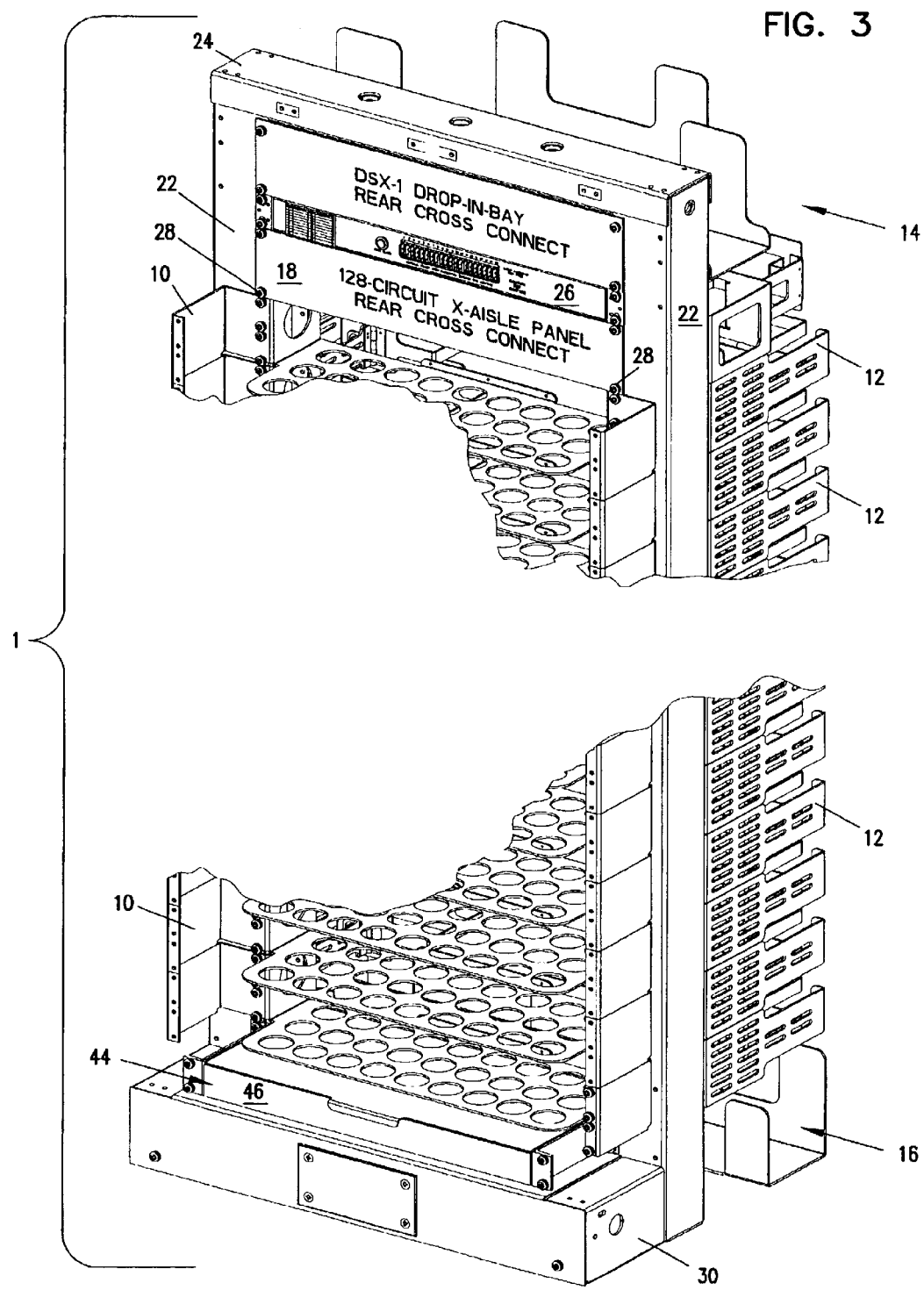
FIG. 3 is a front perspective view of the upper and lower portions of the telecommunications rack of FIG. 1.
Figure 3A:
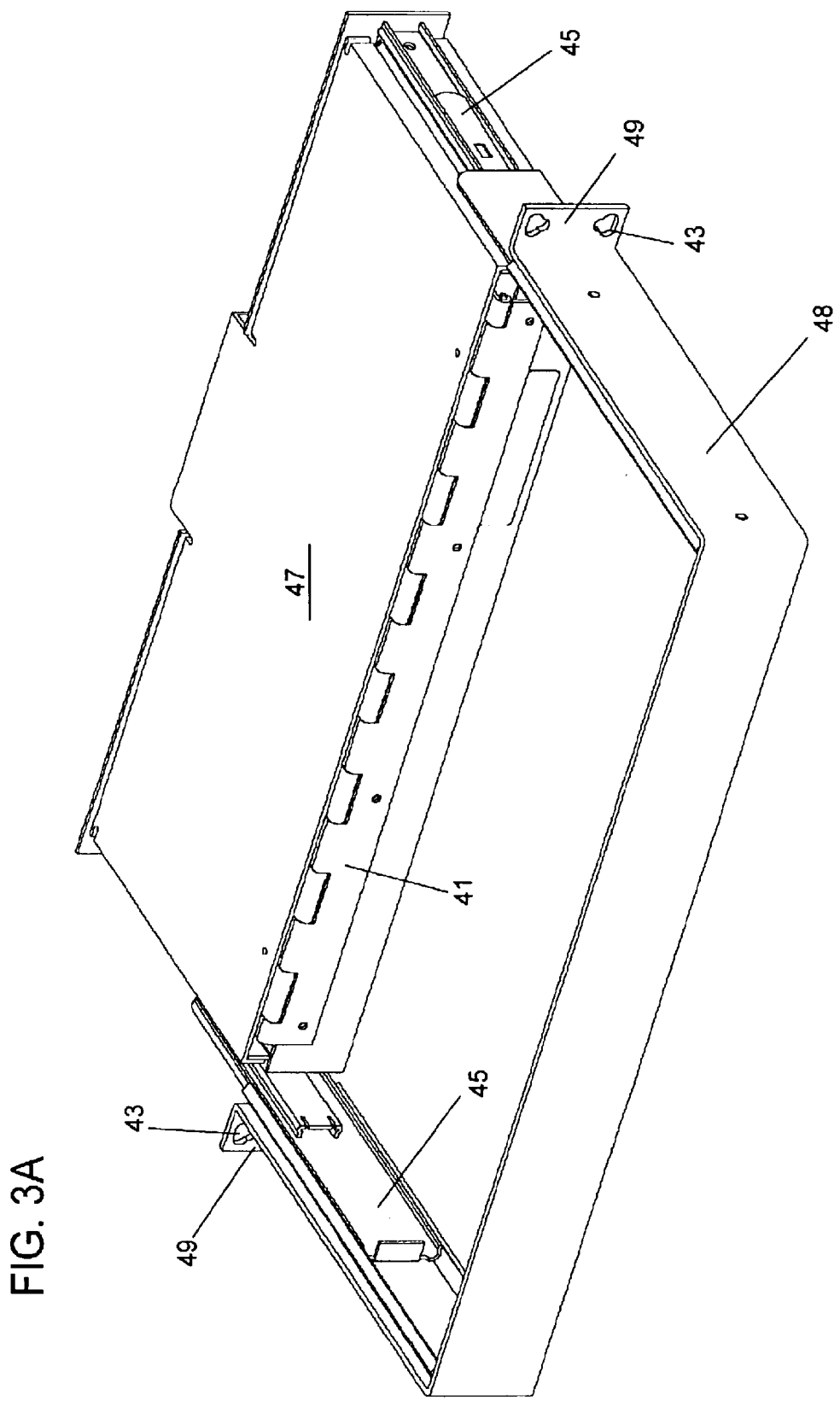
FIG. 3A is a rear perspective view of the drawer of the telecommunications rack of FIG. 3 in the open position.
Figure 3B:
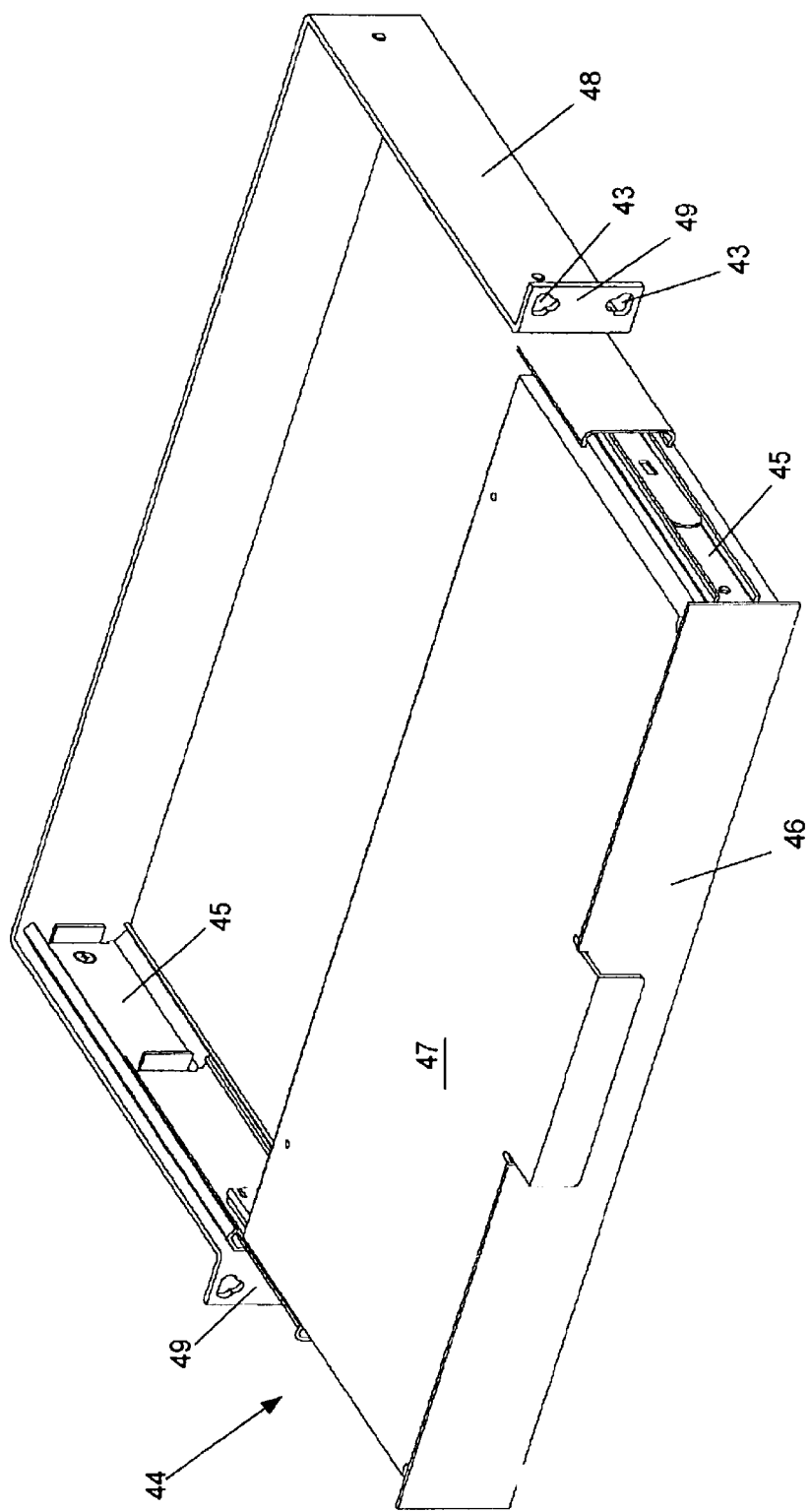
FIG. 3B is a front perspective view of the drawer of the telecommunications rack of FIG. 3 in the open position.
Figure 5:
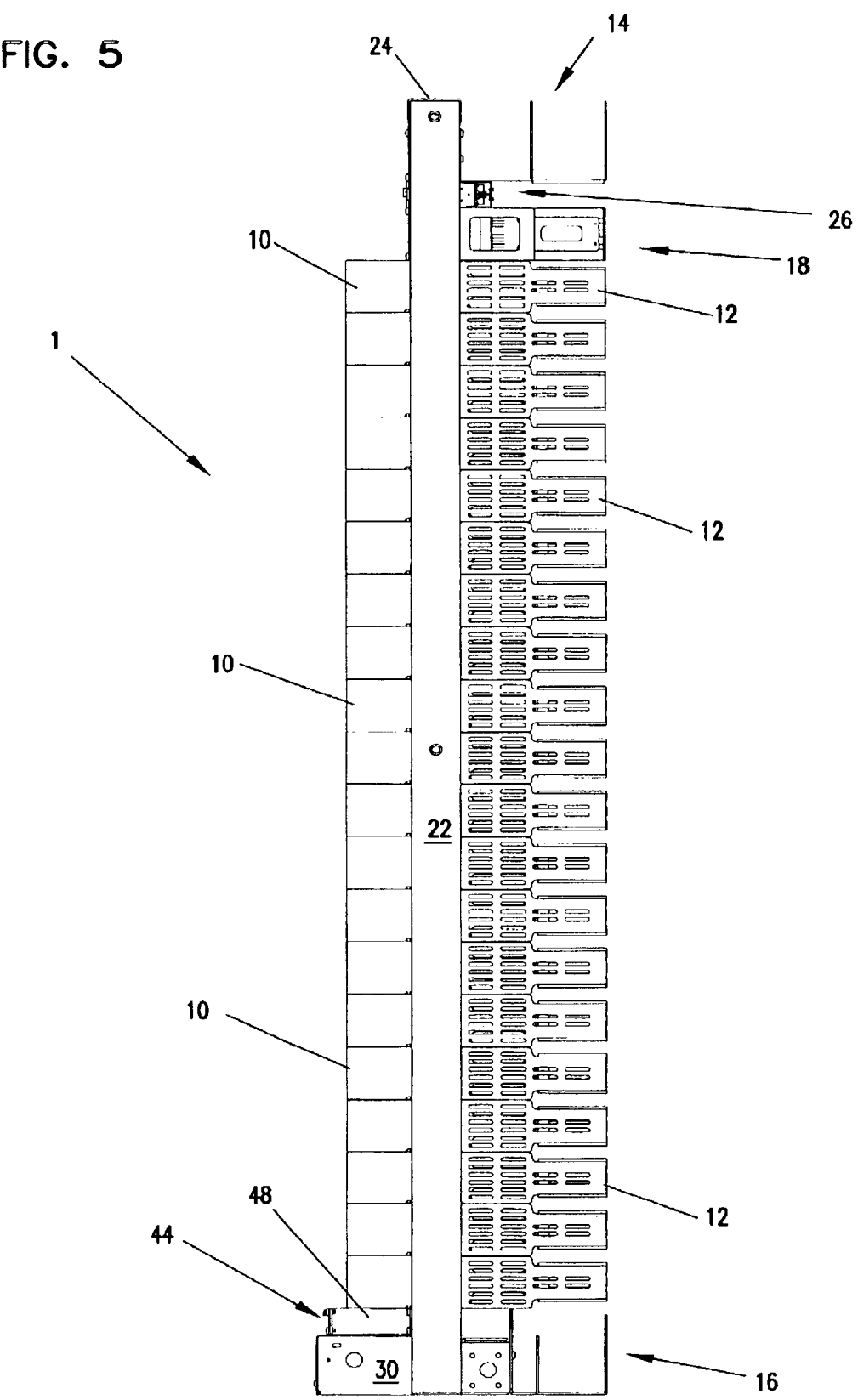
FIG. 5 is a side view of the telecommunications rack of FIG. 1.

Referring to FIGS. 3A and 3B, further aspects of drawer 44 are shown. Drawer 44 includes a tray 46 which slides within a drawer shell 48 which is affixed to base 30 of rack 1. Tray 46 of drawer 44 is adapted for storage of jumper cables, cross-connect cables and/or small tools which might be needed by an operator servicing or configuring the equipment held by rack 1. Tray 46 is slidably mounted to a shell 48 by compound drawer slides 45. These slides allow tray 46 to be extended from shell 48 to the extent shown in FIGS. 3A and 3B, so that a module 11 mounted to rack 1 immediately above drawer 44 will not obscure access to the contents of tray 46. Tray 46 includes a cover 47 which is hingedly mounted to tray 46 with hinge 41 so as to hinge upwardly to allow access to the drawer interior. Shell 48 includes mounting flanges 49 with mounting holes 43. Fasteners such as screws 28 are inserted through mounting holes 43 to mount drawer 44 to rack 1. Drawer 44 fits into space which would otherwise be left vacant and which is not usable for additional switching or connection modules due to lower cable trough 16 preventing access to the rear of a module mounted in this location.

Figure 6:
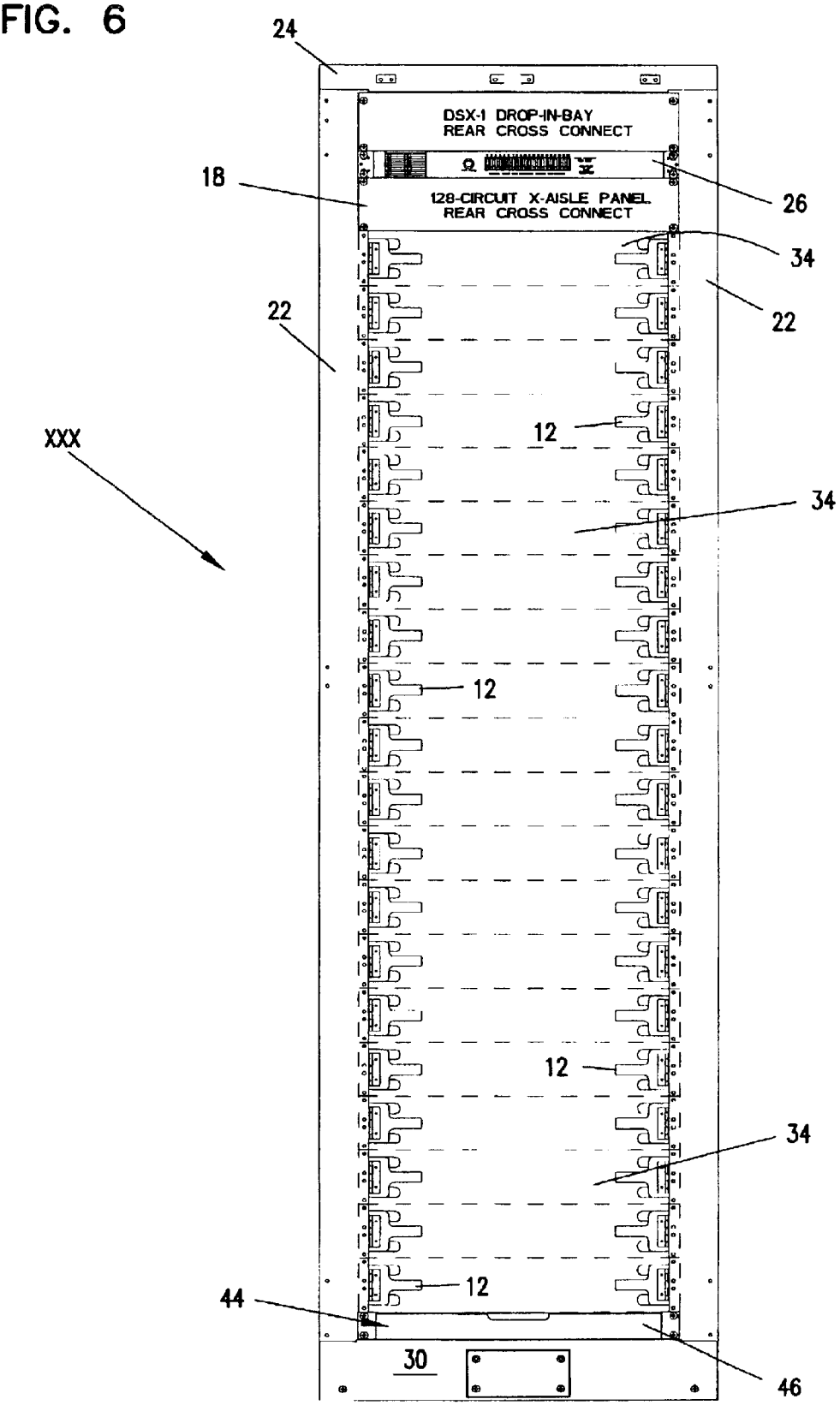
FIG. 6 is a front view of the telecommunications rack of FIG. 1 with the module mounts removed and their positions shown by dashed lines.
Figure 7:
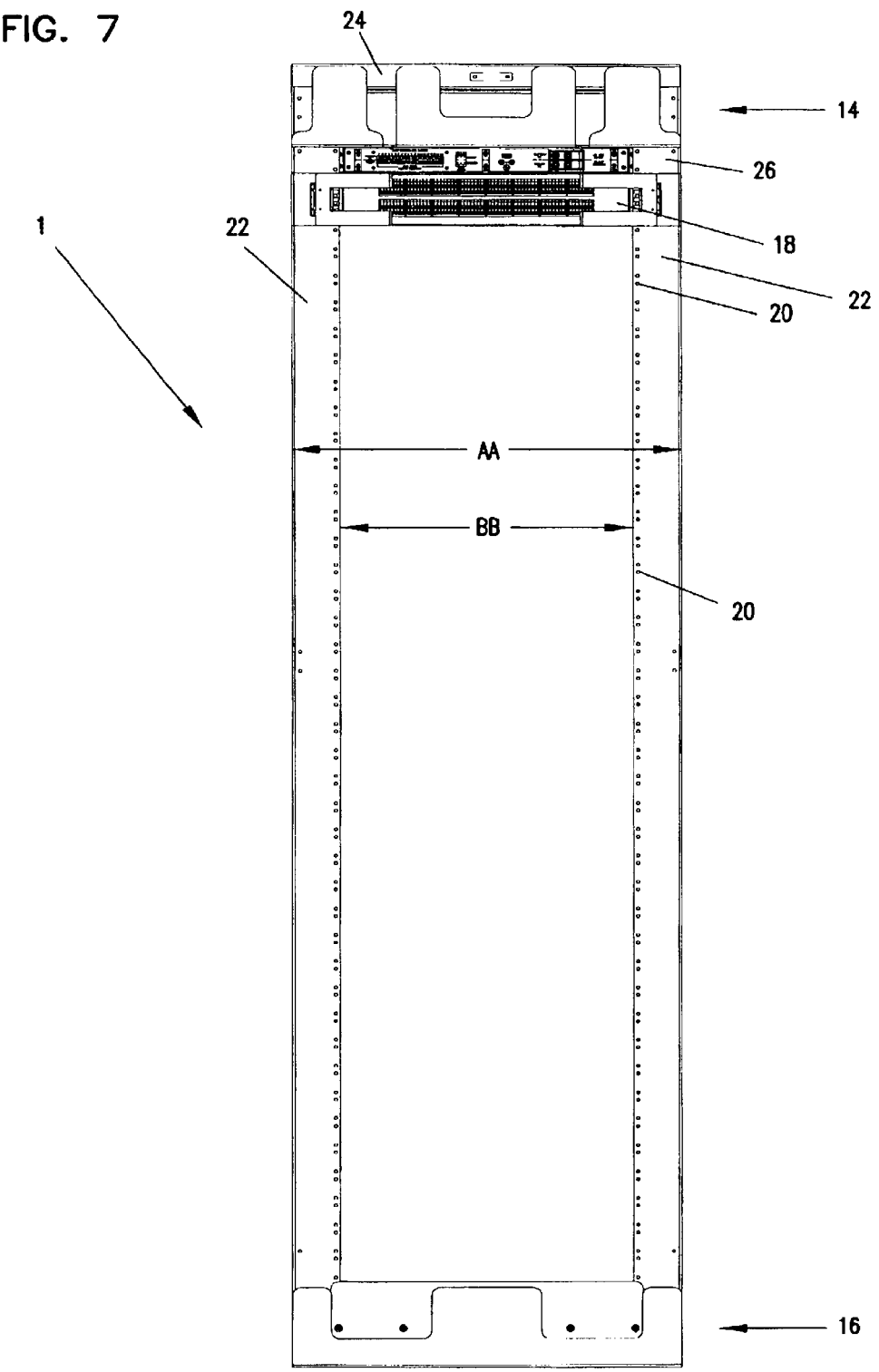
FIG. 7 is a rear view of the telecommunications rack of FIG. 1 with the vertical cable management structures and module mounts removed.
Figure 8:
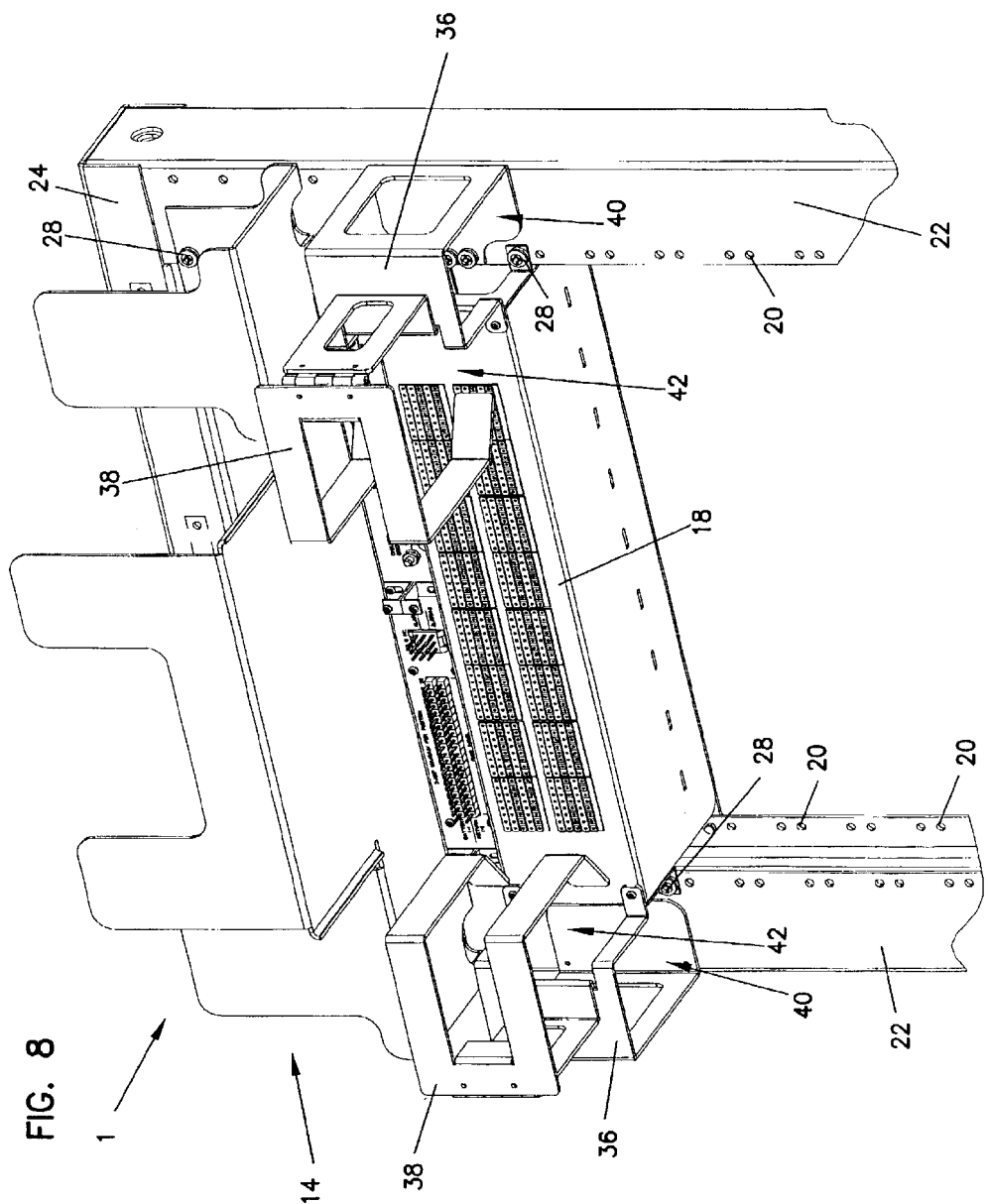
FIG. 8 is a rear perspective view of the upper portion of the telecommunications rack of FIG. 7.
Figure 9:
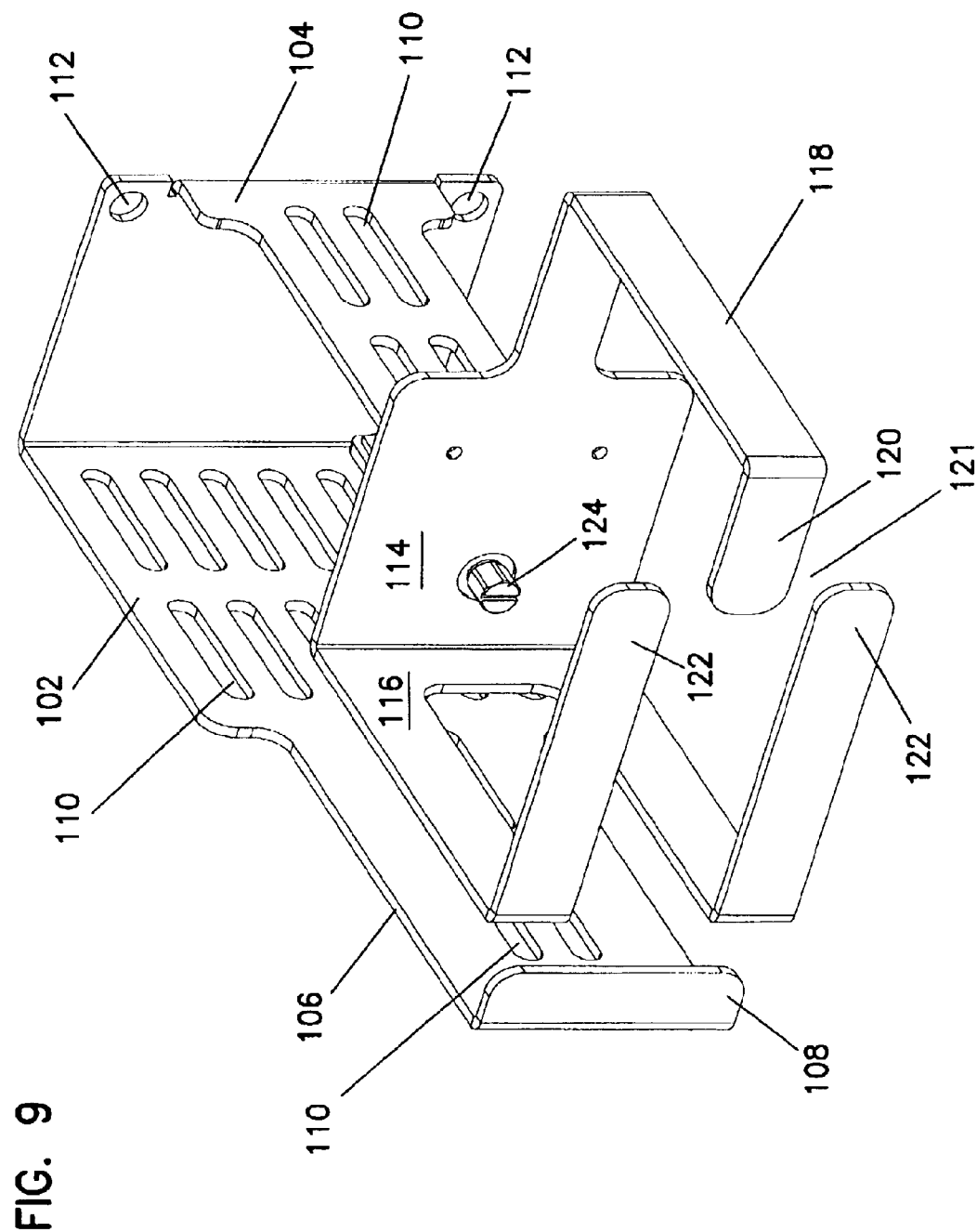
FIG. 9 is a rear perspective view of a vertical cable management structure.
Figure 10:
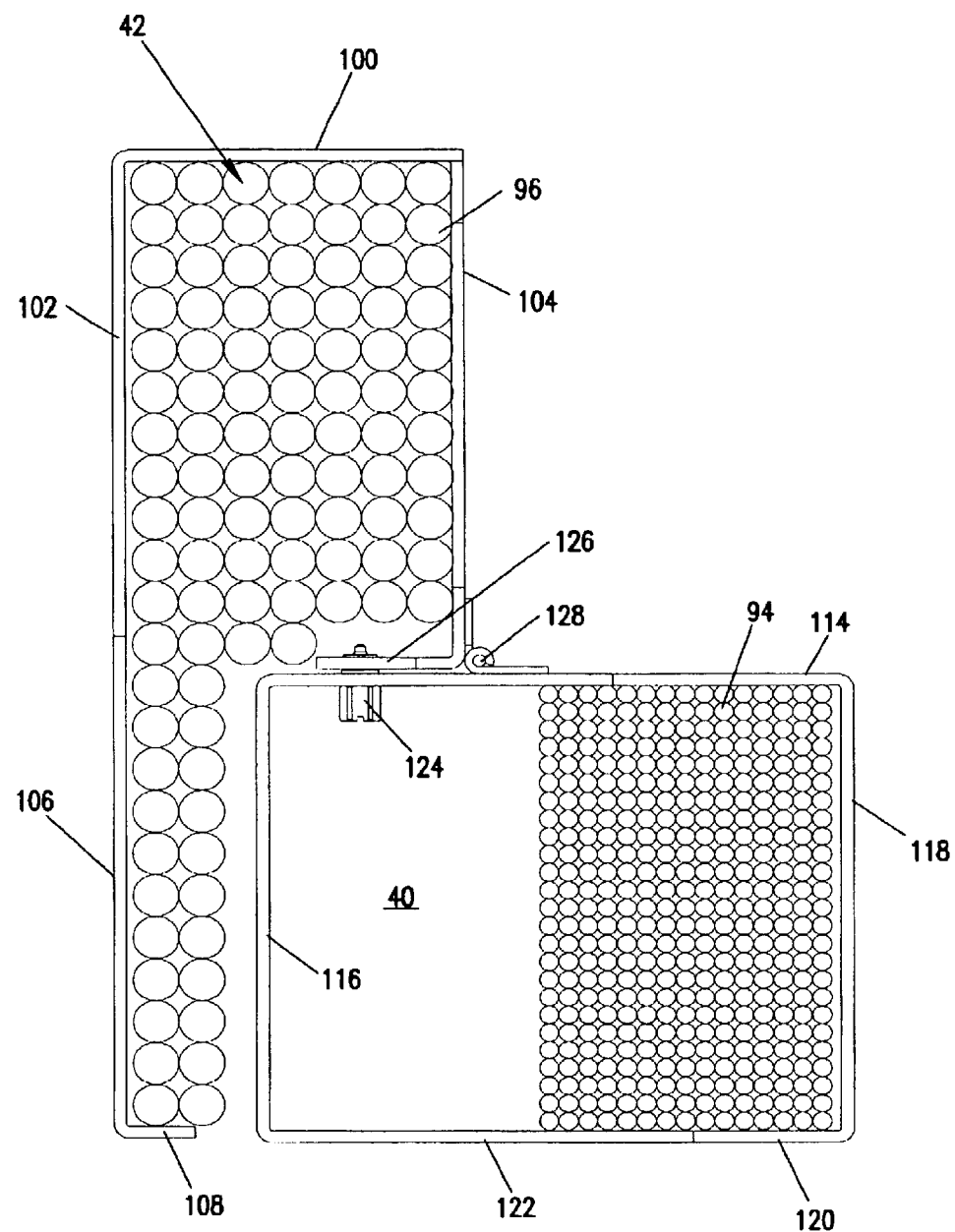
FIG. 10 is a top view of the vertical cable management structure of FIG. 9 with telecommunications cables.
Figure 11:
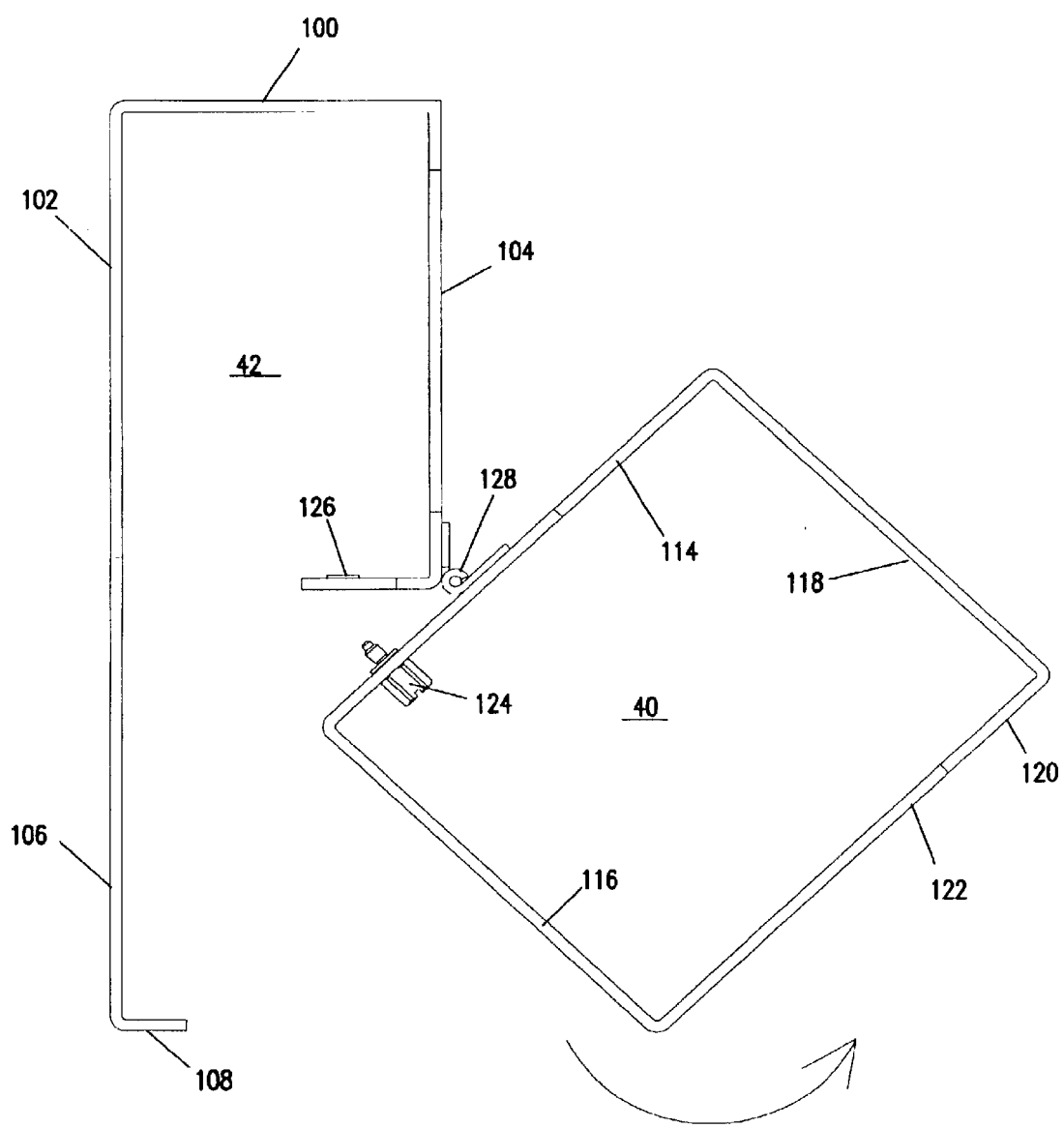
FIG. 11 is a top view of the vertical cable management structure of FIG. 10 with the cross-connect cable guide swung out to allow access to the network interface cable guide.
Figure 12:
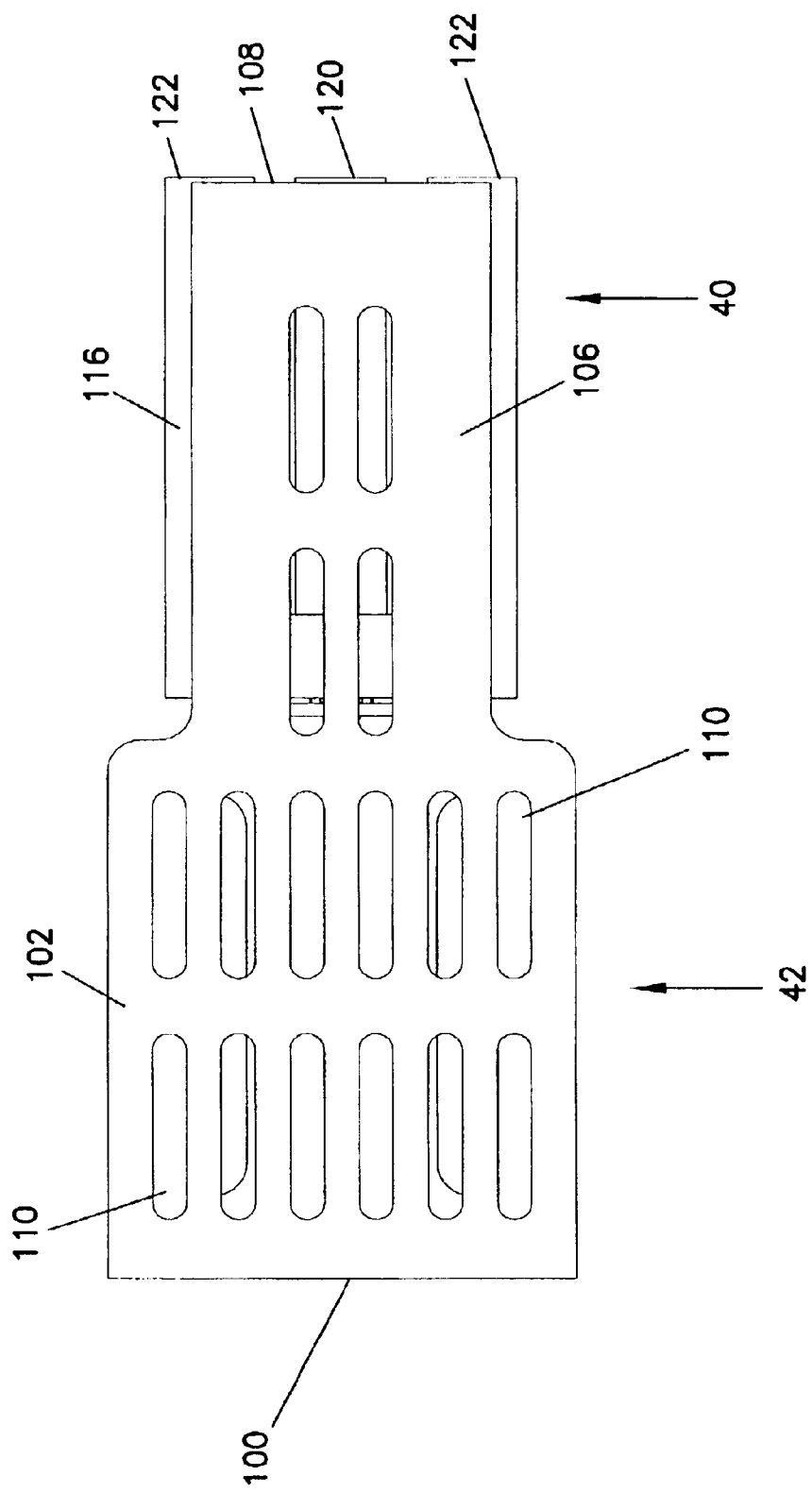
FIG. 12 is a view of the outer side of the vertical cable management structure of FIG. 9.

Rack 1, as shown in FIGS. 6 through 8, includes a base 30, two vertical frame members 22 and a top cap 24. Both frame members 22 are u-shaped with the open end of the u-shape facing the other frame member. Spaced along the inner edges of frame members 22 are a series of openings 20 for fastening different pieces of telecommunications connection and switching equipment. Indicated by the dashed lines in FIG. 6 are module mounting locations 34. In the illustrated embodiment, mounting locations 34 are configured to accept 3.5 inch high modules.

The module mounts 10 shown in FIGS. 1 through 5 are fastened to rack 1 by removable fasteners such as screws 28 engaging openings 20. Similarly, cross-aisle connection panel 18 and upper trough 14 are mounted to rack 1 by screws 28 engaging openings 20.

Referring to FIG. 8, the upper entry to vertical cable channels 40 and 42 can be seen. Channels 40 and 42 are defined adjacent to upper trough 14 by cable brackets 36 and 38, which are part of cross-aisle switching panel 18. Panel 18 and brackets 36 and 38 will be discussed in more detail below with reference to FIGS. 27 through 30.

Referring now to FIGS. 9 through 13, vertical cable guides 12 are shown in greater detail. Vertical cable guides 12, when mounted to vertical frame members 22 of rack 1, serve to further define vertical cable channels 40 and 42. As shown in the FIGS., channel 40 carries cross-connect jumpers 94 between modules mounted in the same or different racks, and channel 42 carries network infrastructure cables 96 to the modules. Channel 42 is defined in each vertical cable guide 12 by a mounting wall 100, from which extends an inner wall 104 and an outer wall 102. Outer wall 102 is a full height wall, so that a continuous wall is formed by the combination of all outer walls 102 of each vertical cable guide 12 when mounted as shown in FIG. 1. Further from mounting wall 100 on outer wall 102 is an outer wall 106, which is less than the height of outer wall 102. At the end of outer wall 106 is a flange 108. Extending from the opposite side of mounting wall 100 from outer wall 102 is inner wall 104. Inner wall 104 is less than the overall height of vertical cable guide 12 to permit network infrastructure cables 96 to pass from channel 42 to connect with modules attached to rack 1. Inner wall 104 extends approximately the same distance as outer 102 and ends at a flange 126. In outer walls 102 and 106, and inner wall 104 are a series of cable tie-off holes 110. As cables 96 are installed within cable channel 42, they can be secured to the sides of channel 42 by cable ties or other similar items inserted through cable tie-off holes 110. In mounting wall 100 are formed one or more mounting holes 112. These holes facilitate the mounting of vertical cable guide 12 to frame member 22 of rack 1 with fasteners 28.

Channel 40 is defined in each vertical cable guide 12 by a rear wall 114, side walls 116 and 118, and front fingers 120 and 122. As shown in the FIGS., rear wall 114 and side wall 116 extend the full height of vertical cable guide 12 to form a more or less continuous wall between channels 40 and 42 when vertical cable guides 12 are mounted to the rack 1. As shown in the FIGS. side wall 116 is divided into two arms which in turn become two front fingers 122. Fingers 122 extend from the top and bottom of wall 116 and extend partially across cable channel 40. Finger 120 extending partially across cable channel 40 from the opposite side, overlaps and cooperates with fingers 122 to fully close off cable channel 40. Gaps 121 between fingers 120 and 122 allow cables to be inserted into cable channel 40 by flexing the cables. However, due to the overlap of fingers 120 and 122, cables hanging vertically within channel 40 are prevented from accidentally moving out of channel 40.

Channel 40 is movably mounted to channel 42 by a hinge 128 mounted to wall 114 of channel 40 and at the ends of flange 126 and wall 104 of channel 42. Hinge 128 permits channel 40 to move about a substantially vertical axis. The location of hinge 128 along wall 114 is such that, when channel 40 is rotated so that wall 114 is resting against flange 126, channel 40 essentially closes access to channel 42. This position is defined as the closed position of channel 40. When channel 40 is rotated so that wall 114 is no longer flush against flange 126, access to channel 42 is no longer obscured, and cables within the channel can be removed or new cables can be added to the channel. Latch 124 provides a mechanism for releasably holding channel 40 in a closed position. Any releasable mechanism may be used for this function, including friction latches, spring latches, sliding latches, or as shown, a screw latch which is released by rotating the latch with a tool such as a screwdriver or a nutdriver.

Figure 14:
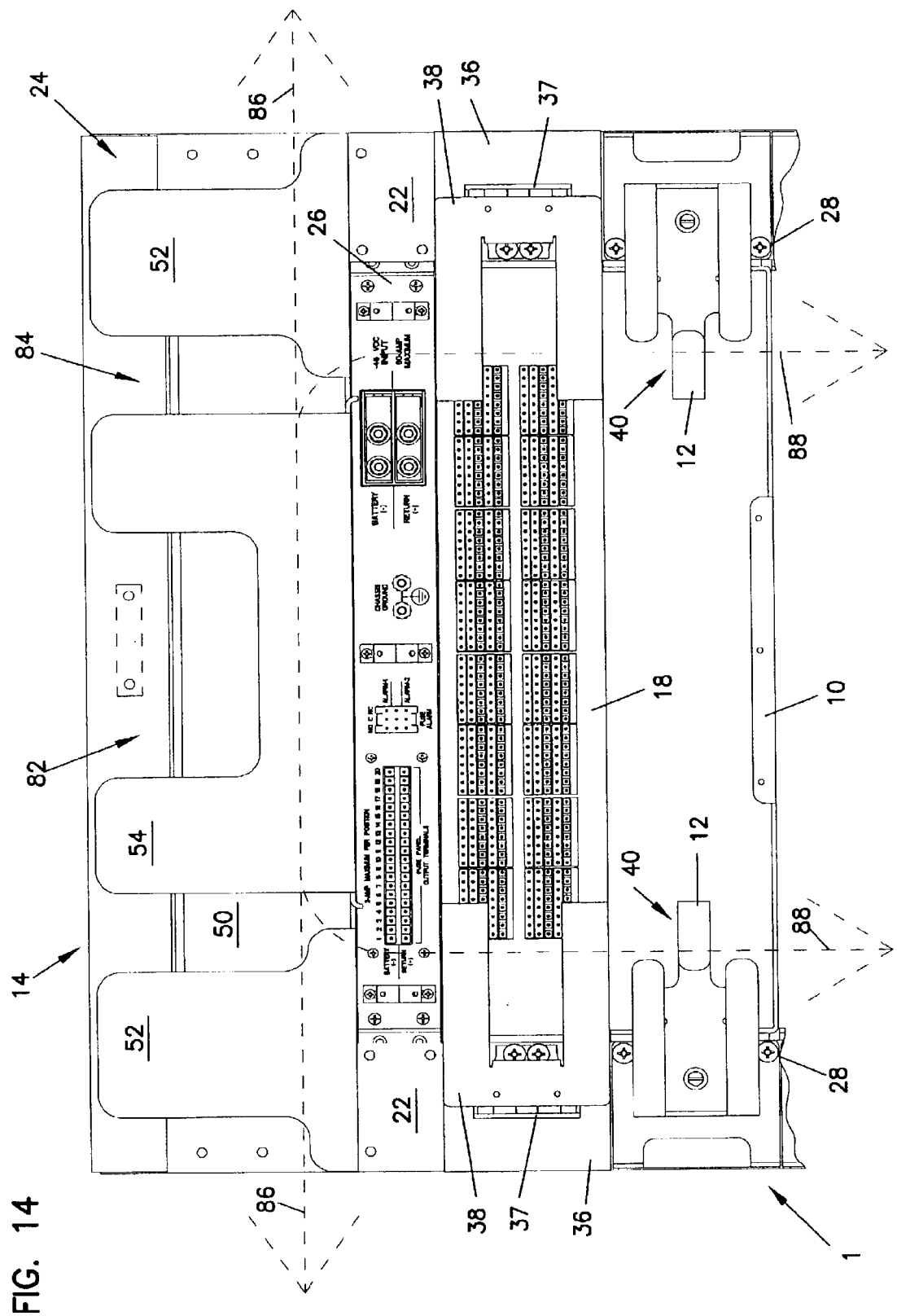
FIG. 14 is a rear view of the upper portion of the telecommunications rack of FIG. 1.
Figure 15:
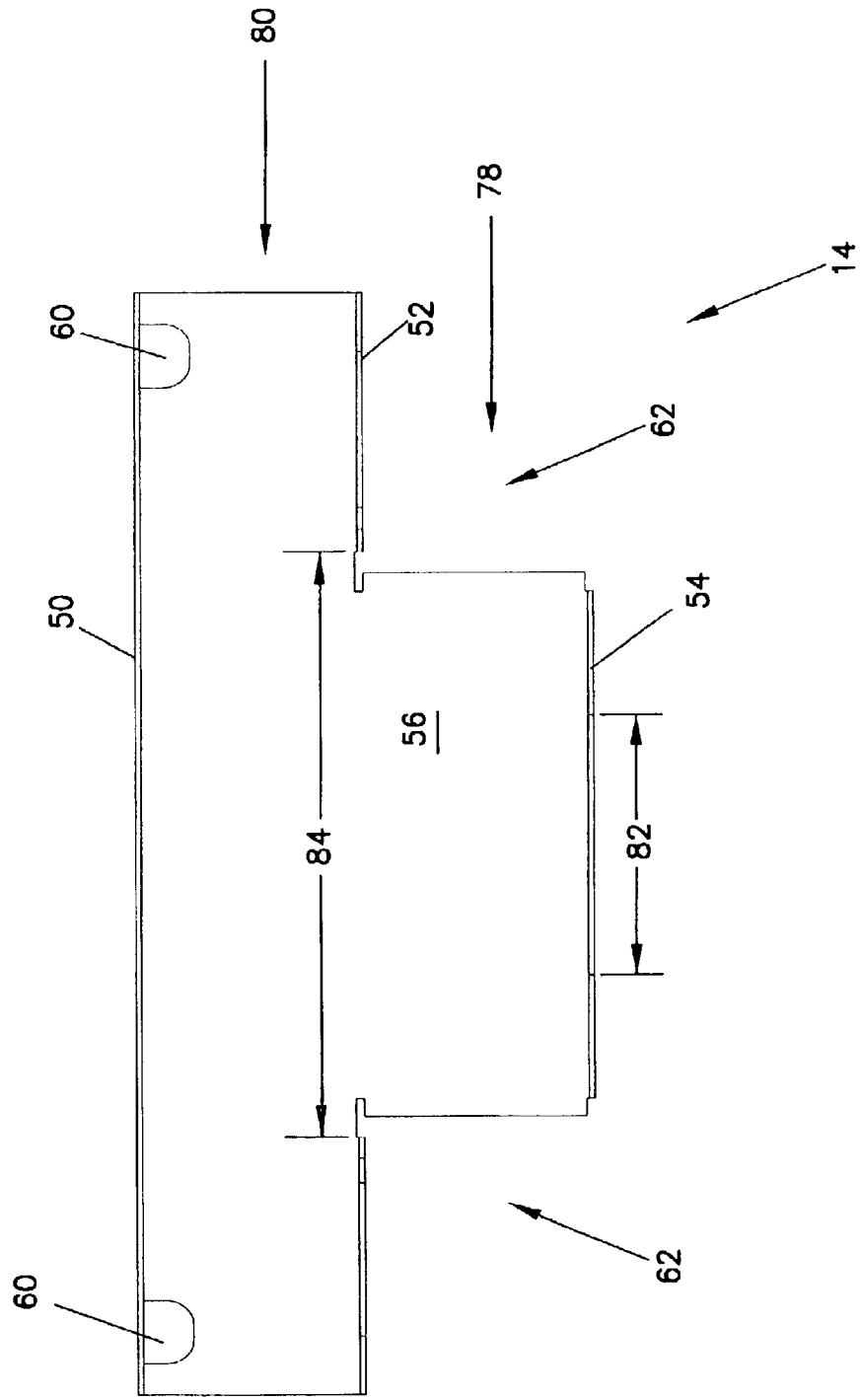
FIG. 15 is a top view of the upper cable trough of FIG. 14.
Figure 16:
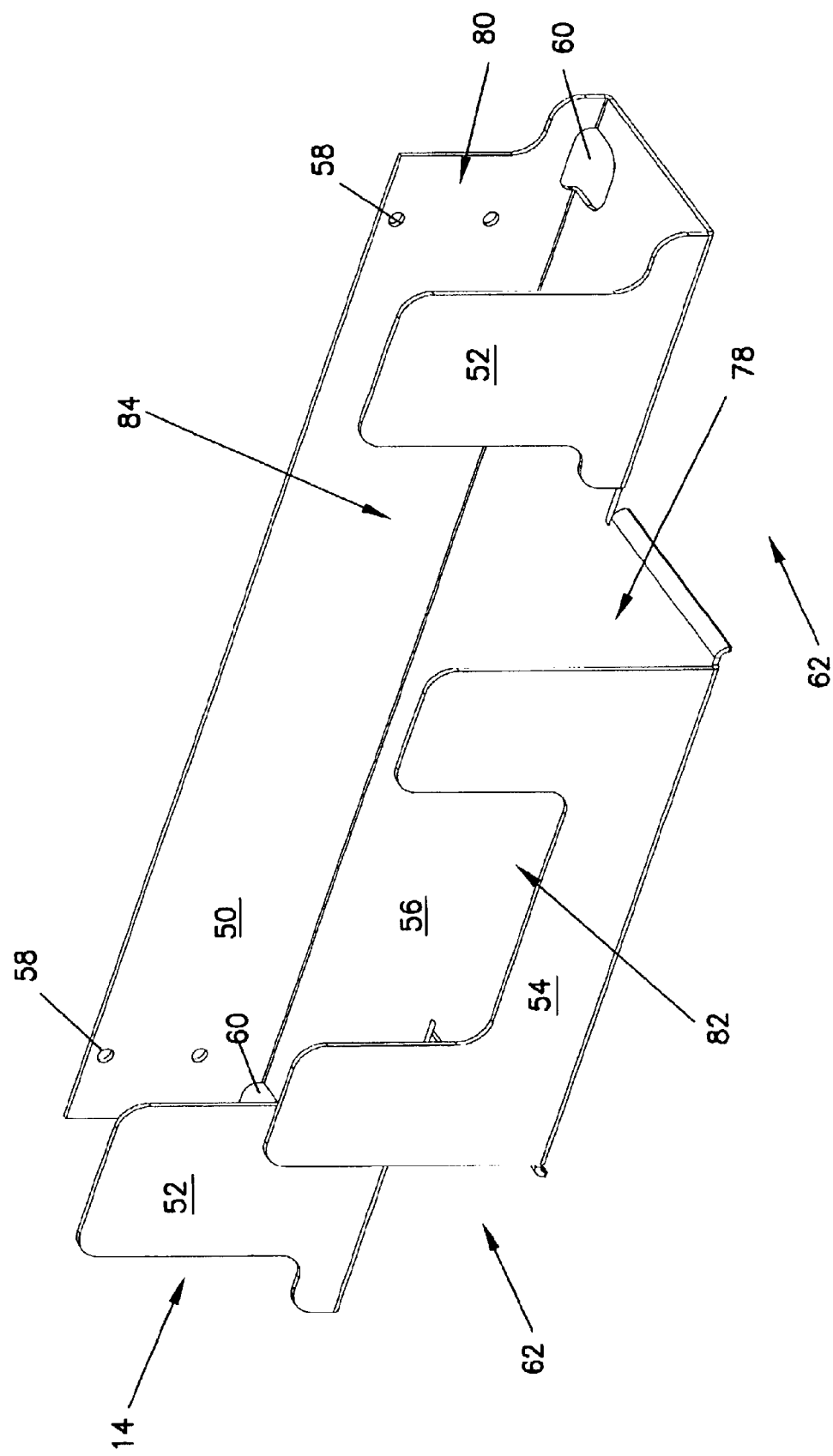
FIG. 16 is a rear perspective view of the upper cable trough of FIG. 14.

Referring now to FIGS. 14 through 18, upper cable trough 14 and lower cable trough 16 are shown. FIG. 14 shows the upper portion of rack 1 with upper cable trough 14 mounted adjacent the top of rack 1. As shown in FIGS. 14 through 16, upper trough 14 includes a mounting wall 50, a first outer wall 52, a second outer wall 54 and a bottom 56. Upper trough 14 extends the full width of rack 1. Mounting wall 50 includes mounting openings 58. Upper trough 14 is attached to frame members 22 by fasteners such as screws 28 inserted through mounting openings 58 and engaging openings 20. First inner wall 52 defines an opening 84. In the embodiment of upper cable trough 14 shown in FIGS. 14 through 16, opening 84 essentially divides first outer wall 52 into two separate walls 52. As seen from above in FIG. 15, first outer wall 52 cooperates with mounting wall 50 and bottom 56 to form a first horizontal cableway 80. Bottom 56 extends through opening 84 and, in cooperation with first outer wall 52 and second outer wall 54, forms a second horizontal cableway 78. An opening 82 is formed in second outer wall 54. A cable exit 62 is formed at both ends of bottom 56 within second cableway 78. Infrastructure cable opening 60 is formed in bottom 56.

Opening 82 permits easier visibility of and access to cables lying within second horizontal cableway 78. Opening 82 also cooperates with opening 84 to provide visibility of and access to cables lying within first horizontal cableway 80. Opening 66 permits infrastructure cables from vertical cableway 42 to pass through bottom 56 and into or through first horizontal cableway 80, as required.

Figure 13:
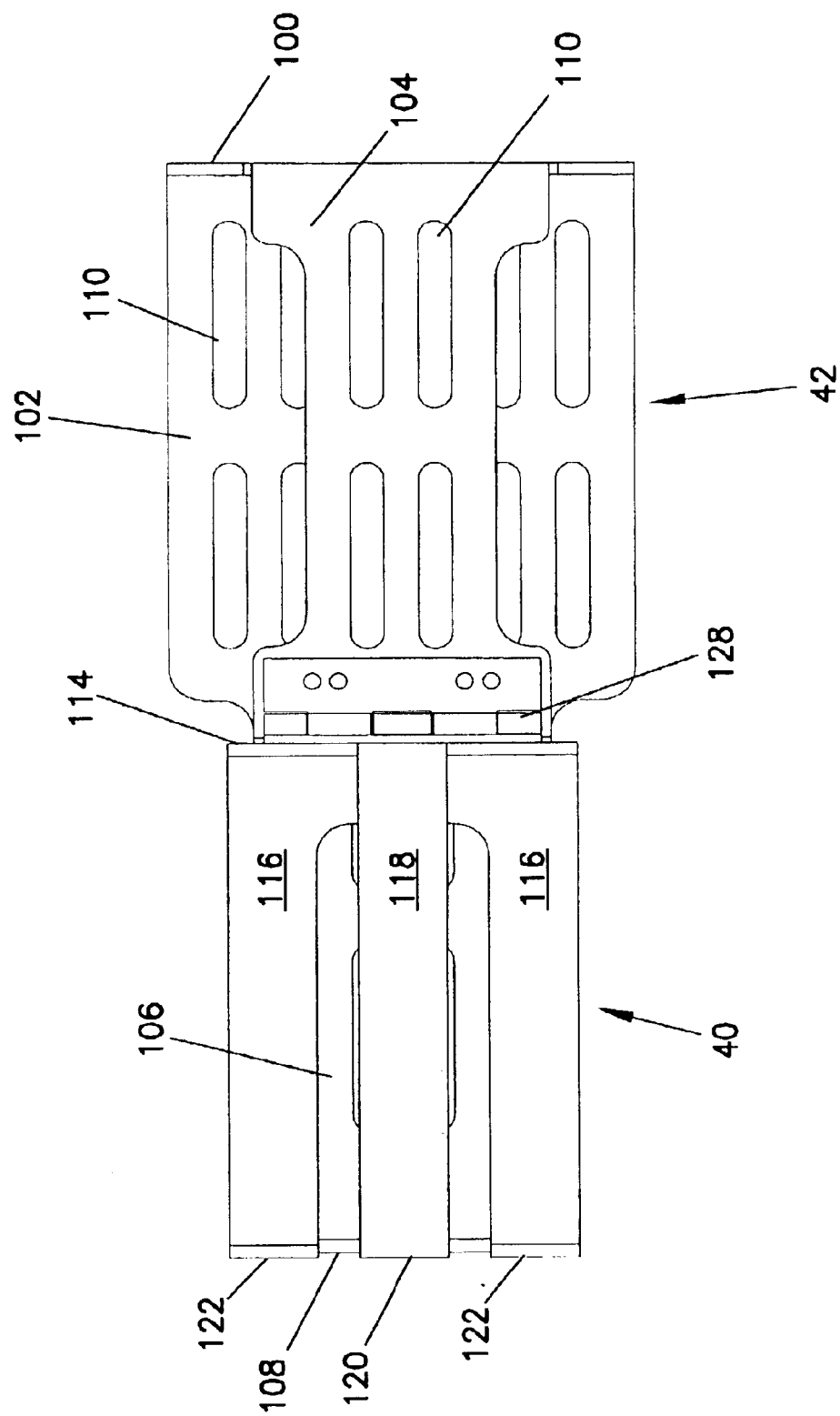
FIG. 13 is a view of the inner side of the vertical cable management structure of FIG. 9.
Figure 13A:
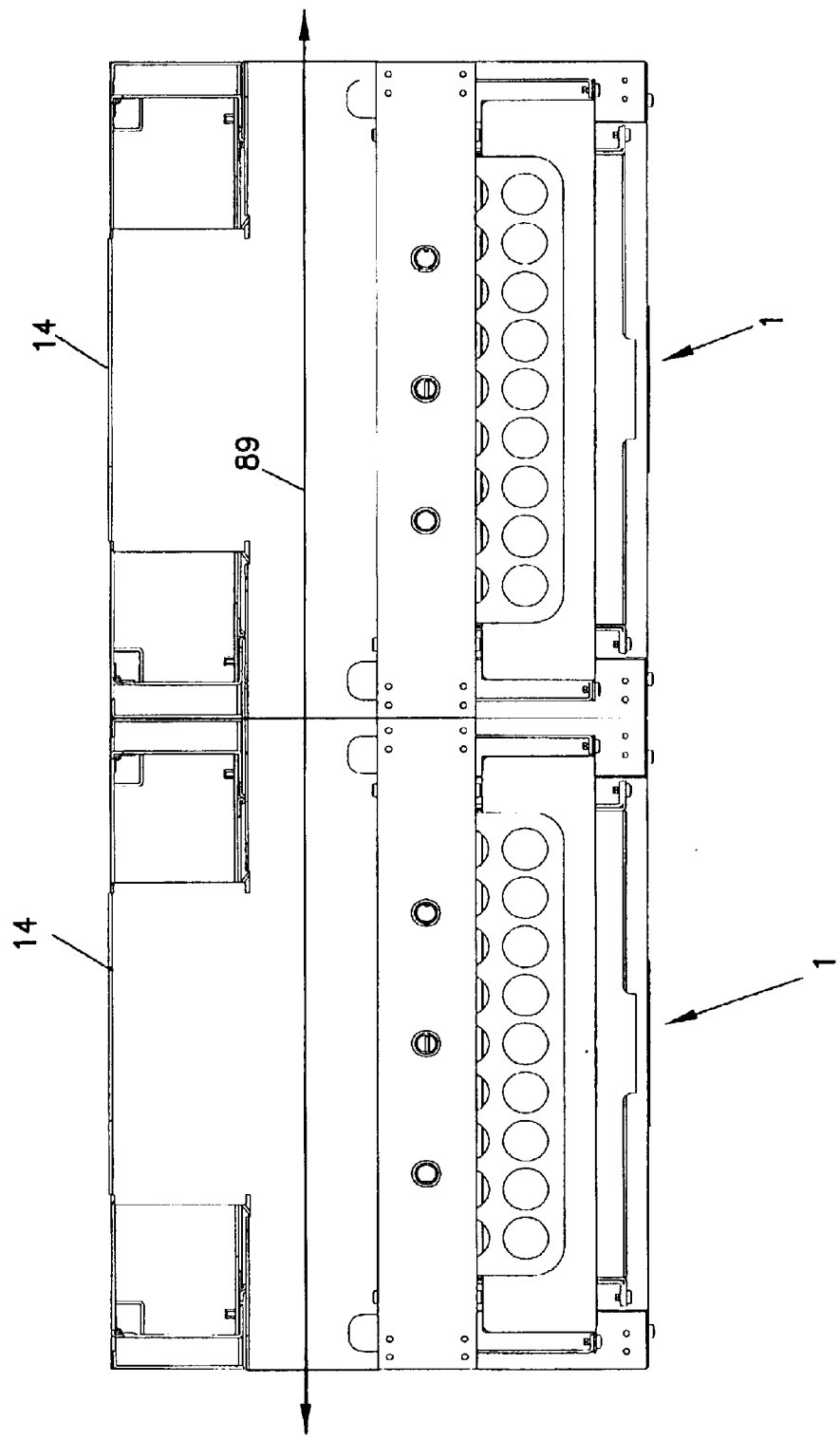
FIG. 13A is a top view of two telecommunications racks mounted adjacent to one another forming a continuous cableway.

When in use on a rack 1, first horizontal cableway 80 serves as a raceway 89 for cables extending between different racks or bays. Second horizontal cableway 78 serves as a cable drop for cables connecting devices in the same rack or for cables exiting the raceway to connect to a device in a particular rack. When multiple racks 1 are mounted in a dense telecommunications installation, upper troughs 14 of adjacent racks 1 are aligned to form a continuous raceway 89, as shown in FIG. 13A. Referring now to FIG. 14, the cables traveling within first horizontal cableway 80 are represented by the dashed line labeled 86. Cables lying within second horizontal cableway 78 are represented by dashed lines labeled 88. Cables 86 travel from one bay to another along continuous raceway 89. When a cable 86 reaches its destination rack 1, the cable exits from raceway 89 through opening 84 into second cableway 78 (becoming a cable 88), then passes out of cableway 78 through opening 62 and enters cableway 40 defined by vertical cable guides 12. Additionally, a cable 88 connected to another device mounted within the same rack 1 might travel up a first vertical cableway 40 on a first side of rack 1, through a first cable exit 62 into second horizontal cableway 78, through the second cable exit 62 back into a second vertical cableway 40 on the second side of rack 1.

Figure 18:
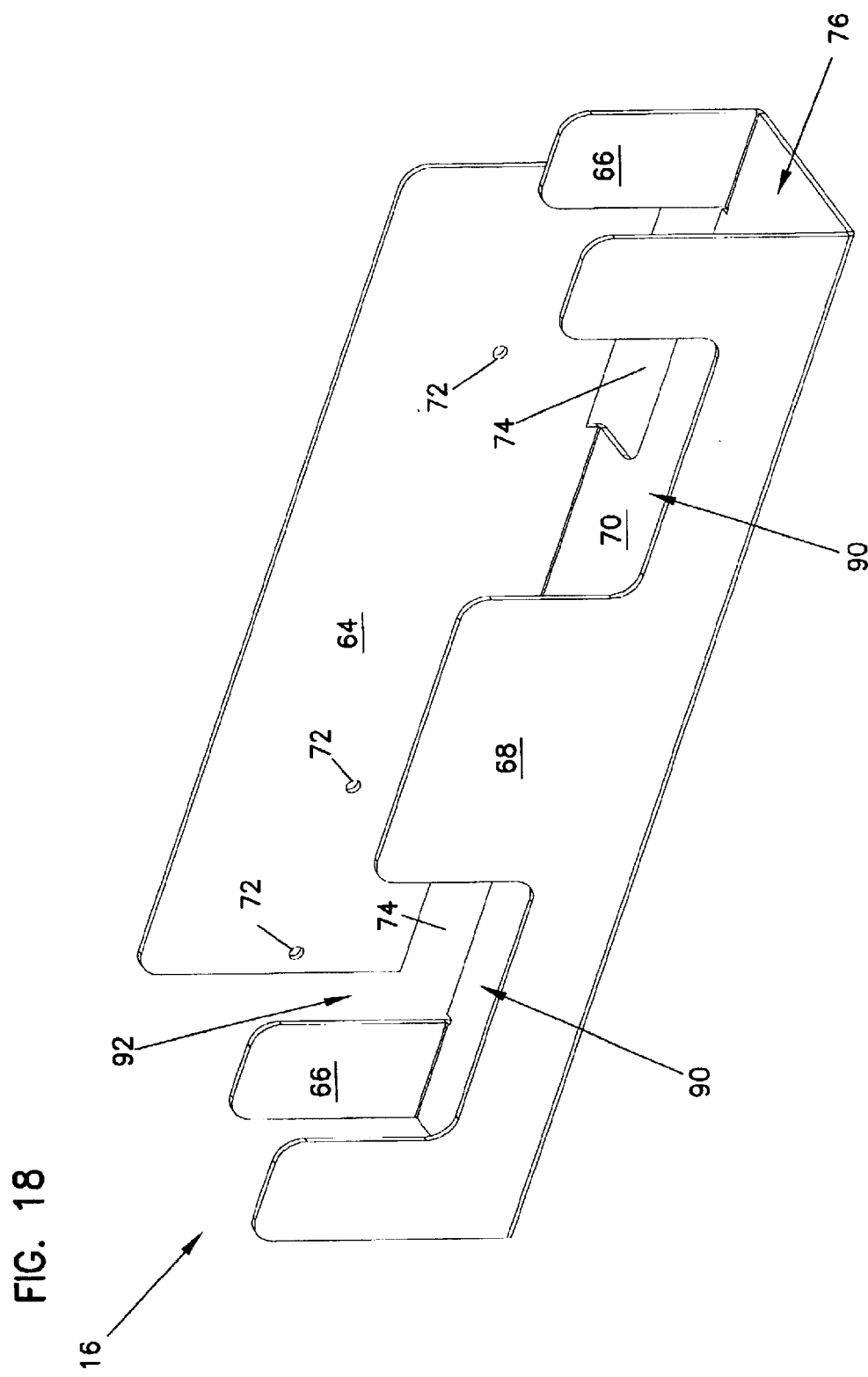
FIG. 18 is a rear perspective view of the cable trough of FIG. 17.

Referring now to FIGS. 17, 17A and 18, lower cable trough 16 is shown. Lower trough 16 includes a mounting wall 64, a first outer wall 66, a second outer wall 68 and a bottom 70. Mounting openings 72 in mounting wall 64 permit fasteners such as screws 28 to be inserted through mounting wall 64 and engage openings 20 on base 30, so that lower trough 16 can be mounted to rack 1. Lower trough 16 extends the full width of rack 1. Cable access openings 74 in bottom 70 between mounting wall 64 and first outer wall 66 permit cables to enter lower trough 16 from below, if rack 1 is mounted on a raised floor. A lower horizontal cableway 76 is defined by first outer wall 66, second outer wall 68 and bottom 70. Opening 92 in first outer wall 66 permits cables entering lower trough 16 through openings 74 to enter lower cableway 76. Openings 90 extend through second outer wall 68 to provide visibility of and access to cables lying within lower cableway 76.

When in use on a rack 1, lower horizontal cableway 76 serves cross-connect jumper cables extending between devices mounted in different racks or bays, as well as jumper cables connecting devices in the same rack. When multiple racks 1 are mounted in a dense telecommunications installation, lower troughs 16 of adjacent racks 1 are aligned to form a continuous lower cableway 77, as shown in FIG. 17A. Referring now to FIG. 17, the cables lying within lower horizontal cableway 76 are represented by the dashed line labeled 98. The dashed line labeled 132 represents cross-connect jumper cables linking devices mounted within the same rack 1 or from devices mounted in another rack 1. A cable 132 is connected to a first device mounted within the rack 1, extends down a first vertical cableway 40 on a first side of rack 1, into lower horizontal cableway 76, back into the second vertical cableway 40 on the second side of rack 1 and to another device in rack 1.

Upper trough 14 and lower trough 16 in the illustrated embodiment are primarily intended for use in telecommunications equipment rack 1 installed on a raised floor, with power and network infrastructure cables entering lower cable trough 14 and vertical cable channels 40 and 42 from beneath the floor. It is anticipated that alternative embodiments of these troughs may also be useful in different installations where some of these cables enter the upper trough from above.

Referring now to FIGS. 7 and 19 through 23, a cross-connect module adapted for mounting with rack 1 is shown. As stated above, the preferred telecommunications equipment rack 1 increases the number of telecommunications circuits that can be supported. For such an installation, multiple racks might be mounted adjacent one another, side-by-side. In this sort of arrangement, it may be desirable that modules or other structures attached to the individual racks, such as the troughs, not extend beyond the outer edge of vertical frame member 22, shown as width AA in FIG. 7. Connecting and switching modules for use with such racks have been mounted between the two vertical frame members 22, within the width BB in FIG. 7. Each circuit to be switched requires one or more jacks mounted to the switching module, and each jack requires some space on the front panel of the module, such as for access ports for cable plugs and tracing LEDs. Additionally, each circuit requires a plurality of connectors for linking to network infrastructure cables and cross-connect cables. In the illustrated embodiment, the connectors are al located on the rear. A cross-connect module 11 of the present invention provides a way of increasing the number of circuits without exceeding the width of rack 1 or requiring that the module have increased height. Module 11 includes a section 164, having a width B, which is sized to fit between the vertical frame members of rack 1. An expanded width front section 162 is provided, the full width of which can be as wide as overall width AA of rack 1 rather than being limited to width BB. Expanded front section 162 has a front face 150 which can support more jacks for a given height than the prior art. In addition, at the rear of module 11 are a first connector section 164 and a narrower second connector section 166, extending beyond a first connector plane 170. Second connector section 166 includes flared sides 182. Flared sides 182 allow a second connector plane 180 to have a width C, which is greater than the width D on first connector plane 170. This design increases the usable width of first connector plane 170 to be greater than width B and allows increased numbers of rear connectors to be supported by module 11. In addition to permitting a greater density within the same rack space, the separation of the connectors planes for the cross-connect jumpers and the connector plane for the network infrastructure cables aids in cable management and helps avoid clutter and confusion.

Figure 19:
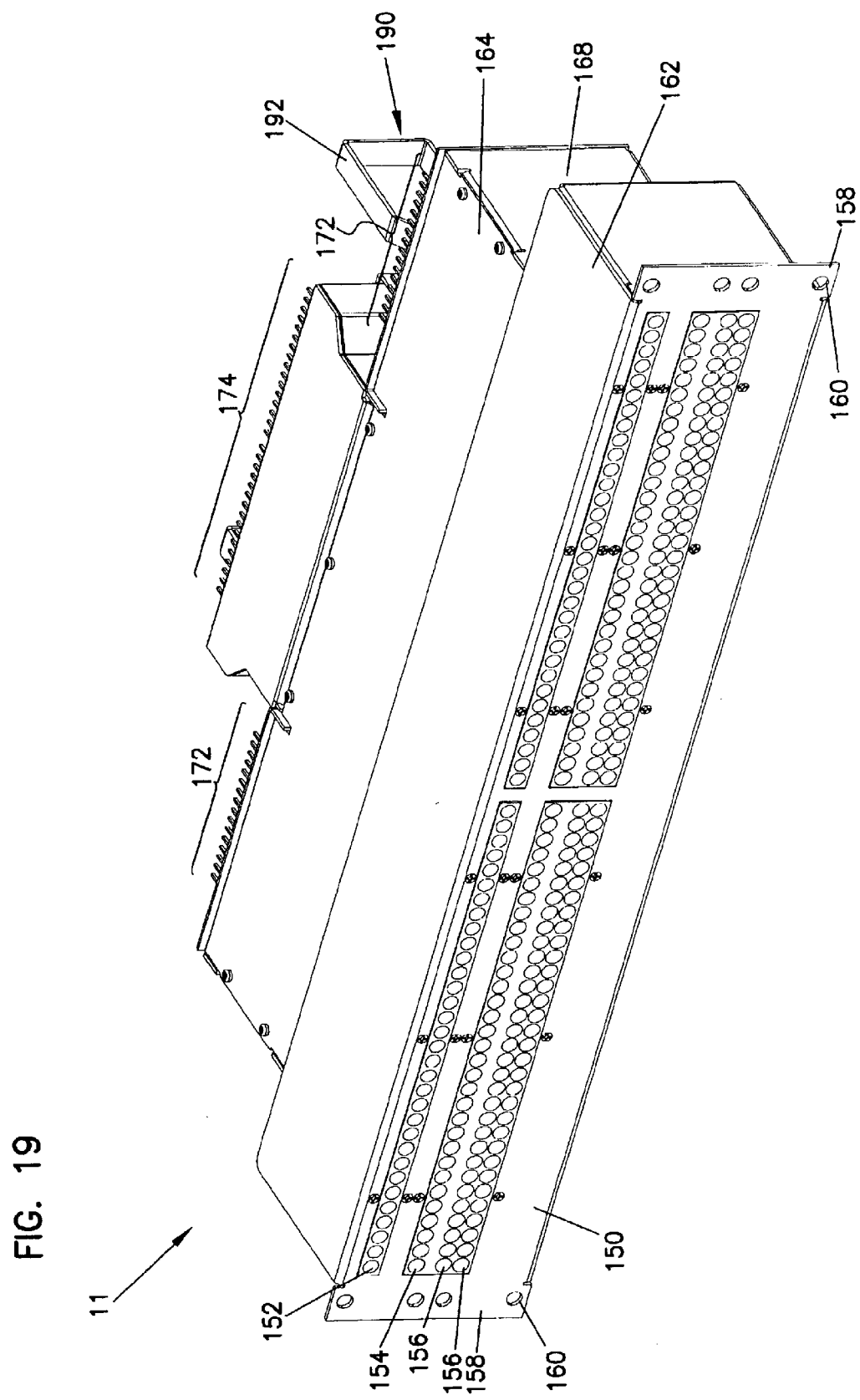
FIG. 19 is a front perspective view of a telecommunications cross-connect module.

Referring now to FIG. 19, front face 150 of module 11 is shown. Mounted to front face 150 are a signal lamp 152 and access openings 154 and 156, the lamps 152 and access openings 154 and 156 are arranged in a vertical column and each vertical column corresponds to a single circuit within module 11. As shown in FIG. 19, there are 64 vertical columns on module 11. Signal lamp 152 is an LED lamp to indicate when the circuit connected with the lamp is energized. Monitor access opening 154 allows a tap to be placed into the circuit without breaking the circuit. Cross-connect access jacks 156 allow patch cables to be inserted into the circuit, breaking the circuit and directing the normal connections to new devices or sources. Taken together, all the monitor and cross-connect access openings mounted to front face 150 are referred to as a jack field. The FIGS. show a bantam jack format for access openings 154 and 156. It is anticipated that other jacks or connectors having a similar function can be mounted to front face 150 to perform the monitoring and cross-connect functions. At either end of front face 150 are mounting flanges 158, through which are formed mounting openings 160. Fasteners such as screws 28 are inserted through openings 160 to engage mounting openings 210 on a module mount 10. Module mount 10 is discussed further below.

Figure 20:
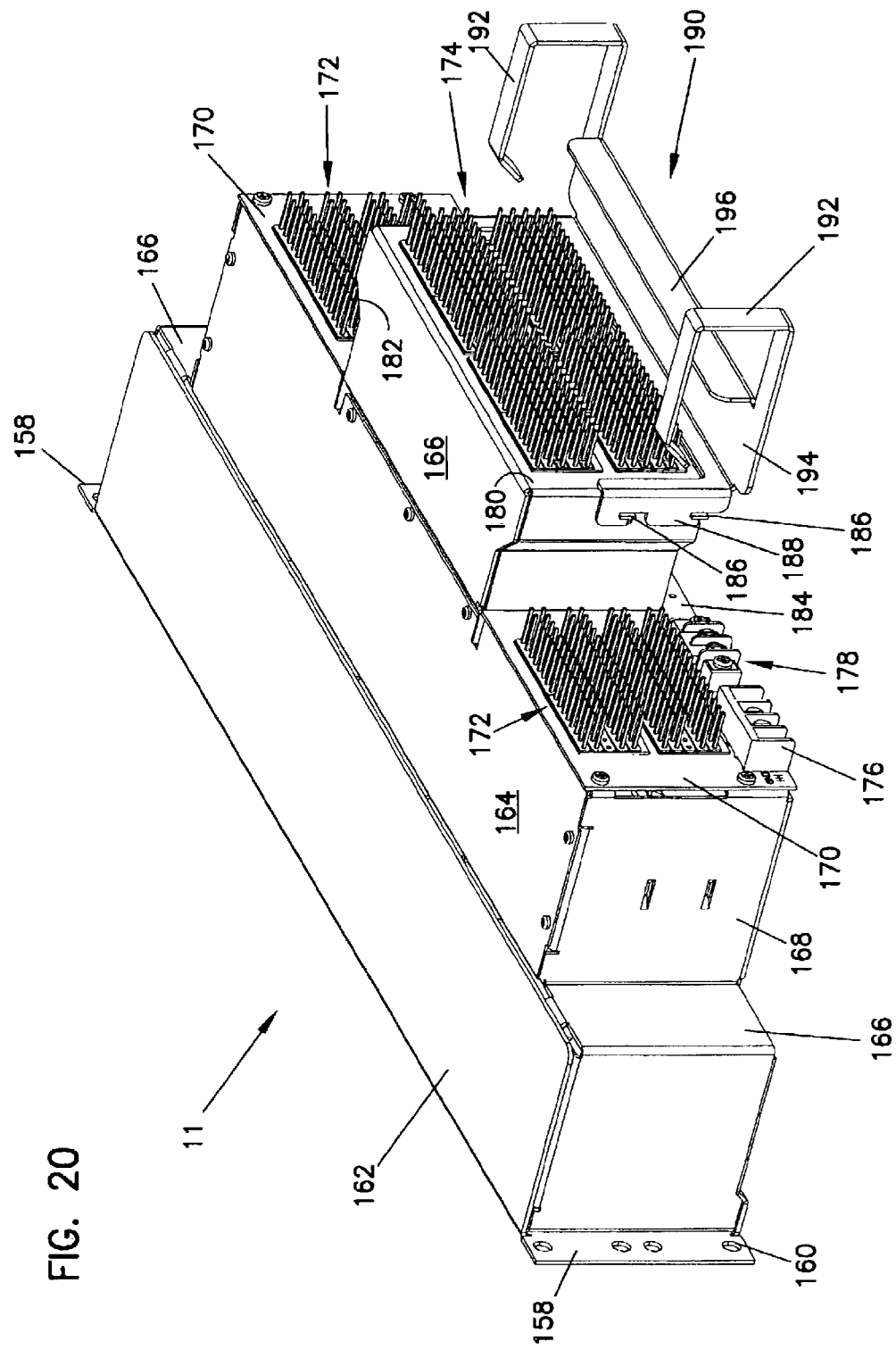
FIG. 20 is a rear perspective view of the telecommunications cross-connect module of FIG. 19.
Figure 21:
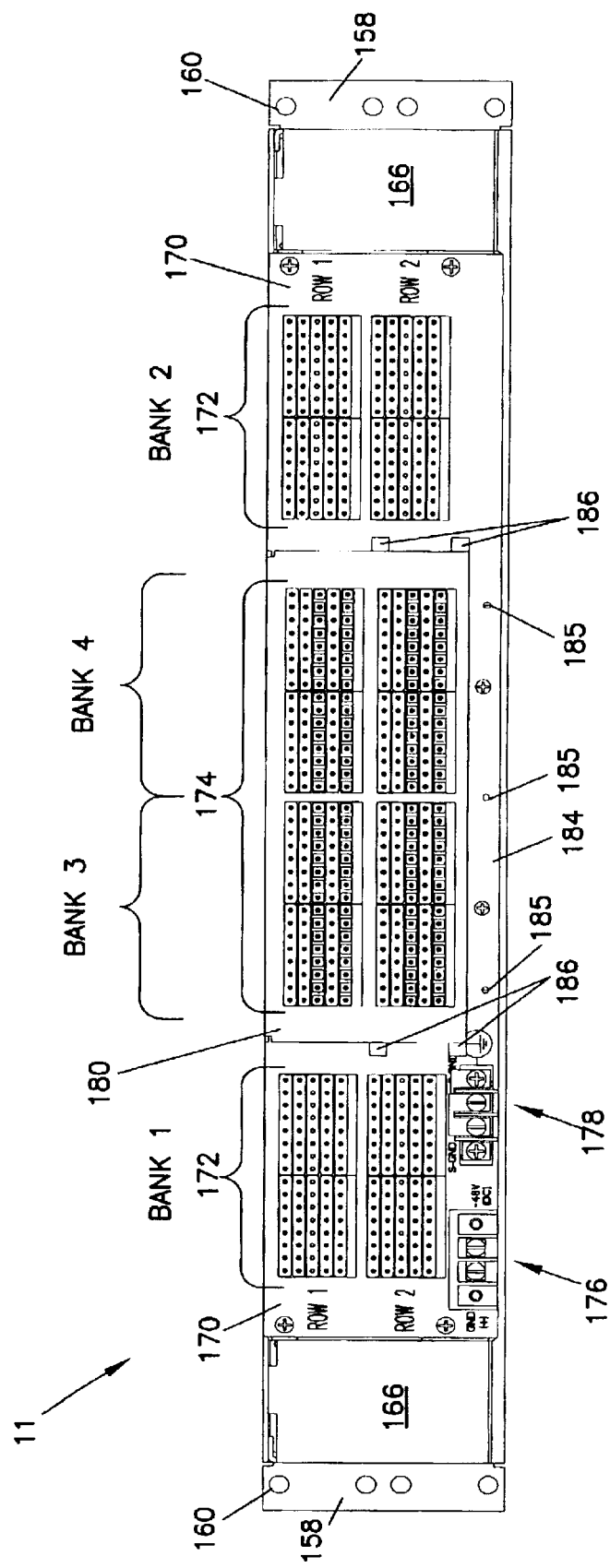
FIG. 21 is a rear view of the telecommunications cross-connect module of FIG. 19 with the jumper tray removed.
Figure 22:
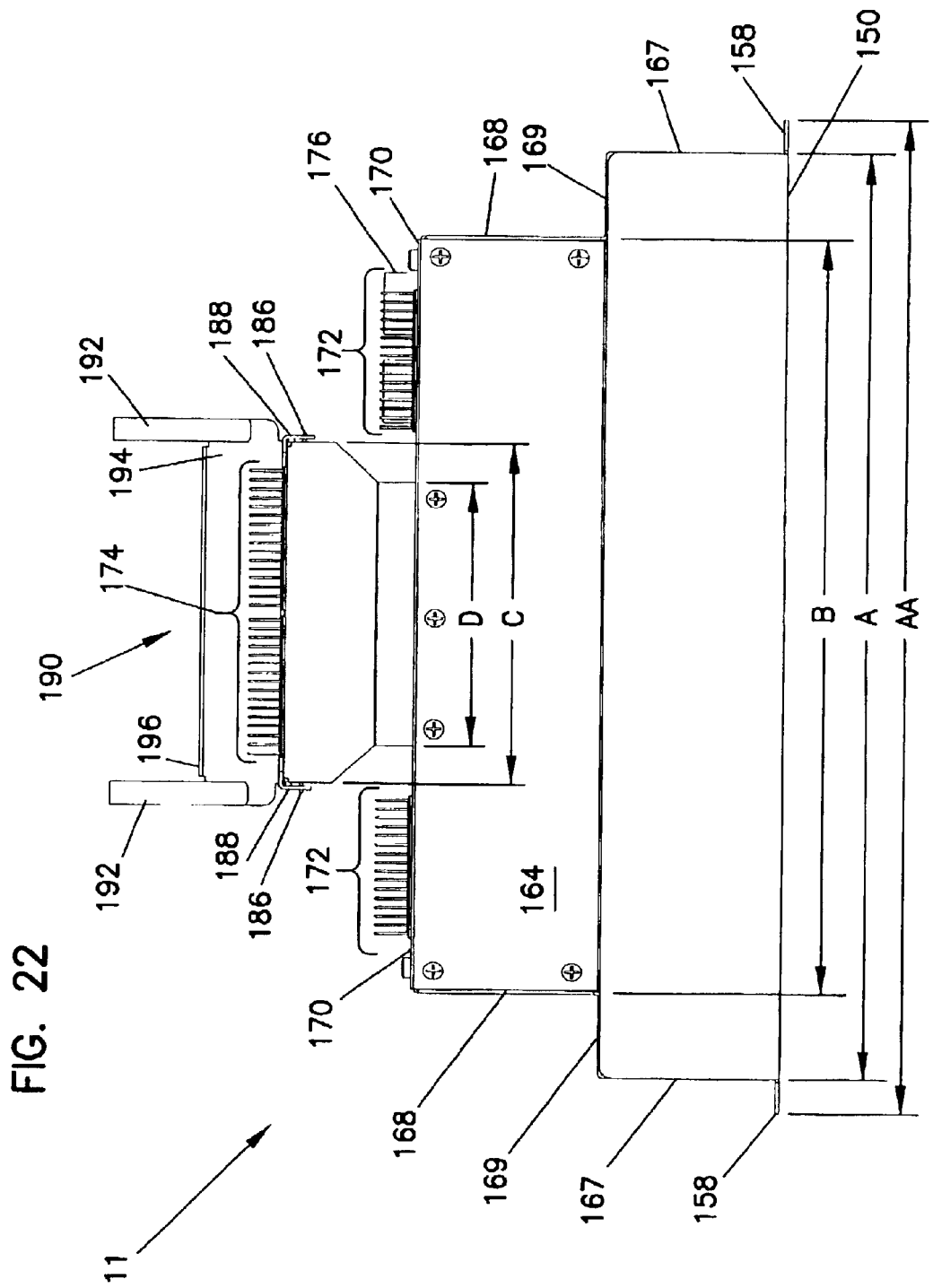
FIG. 22 is a top view of the telecommunications cross-connect module of FIG. 19.

Referring now to FIGS. 20 and 21, the rear connector planes of module 11 are shown. Connectors 172 are mounted to first connector plane 170 in Bank I and Bank II, located on either side of section 166. Network infrastructure cables are linked to connectors 172. As shown in FIG. 21, connectors 172 include sixty-four sets of four connectors each. Each set of four connectors is arranged vertically on face 170. Bank I includes two rows of sixteen sets of four connectors and Bank II includes two rows of sixteen sets of four connectors. Connectors 174 are mounted to second connector plane 180 in Bank III and Bank IV. Cross-connect cables are attached to connectors 174. As shown in FIG. 21, connectors 174 include sixty-four sets of five connectors each. Each set of five connectors is arranged vertically on face 180. Bank III includes two rows of sixteen sets of five connectors and Bank IV includes two rows of sixteen sets of five connectors. FIG. 20A shows the arrangement of connectors 172 and 174.

Figure 19A:
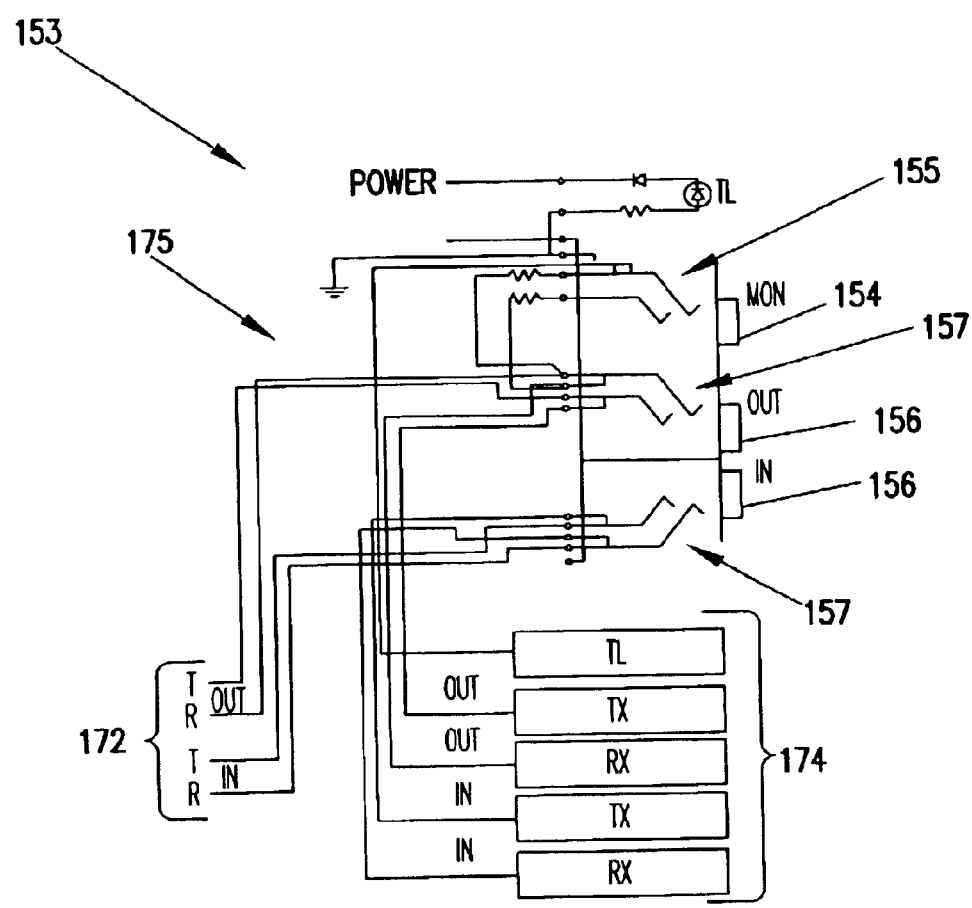
FIG. 19A is a schematic diagram of circuitry within the telecommunications cross-connect module of FIG. 19.

Module 11 has the capacity for handling a total of sixty-four circuits 153. Each circuit 153 includes one set of four connectors 172, one set of five connectors 174, one signal lamp 152, one monitor access opening 154, and two patching access openings 156. A schematic of each circuit 153 is shown in FIG. 19A. In FIG. 19A, the four connectors 172 are labeled T in, R in, T out and R out connectors. The five connectors 174 are labeled TL, TX out, RX out, TX in and RX in. Circuitry 175 within module 11 connects connectors 172 with connectors 174 and includes signal lamp 152, and jacks 155 and 157. Circuitry 175 provides normal closed electrical pathways between:

a) connector 172 labeled T out and connector 174 labeled TX out;
b) connector 172 labeled R out and connector 174 labeled RX out;
c) connector 172 labeled T in and connector 174 labeled TX in;
d) connector 172 labeled R in and connector 174 labeled RX in.

Circuitry 175 provides a normally closed connection between signal lamp 152 and a power source but a normally open connection between signal lamp 152 and a ground source, so that the default state for lamp 152 is un-lit. The example circuit 153 is for DS-1, tip and ring signal processing. Other signal types, such as DS-3 or coaxial may also be employed.

Figure 19B:
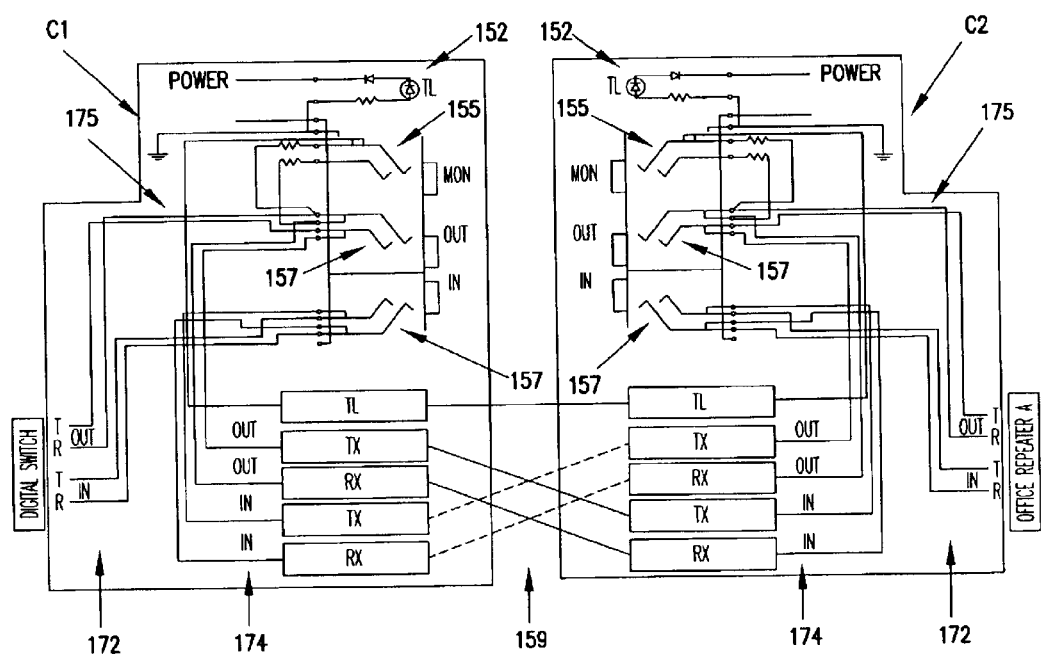
FIG. 19B is a schematic diagram of the use of the circuitry of FIG. 19A for cross-connecting a digital switch and an office repeater.

FIG. 19B shows two circuits 153 schematically connected in a cross-connect function. A signal from a digital switch delivered to connector 172 labeled R in would be transmitted through circuitry 175 of circuit C1 to connector 174 labeled RX in. From there, the signal would be carried by one of the patch cords 159 to connector 174 labeled RX out of circuit C2. Circuitry 175 of circuit C2 then carries any electronic signal from connector 174 labeled RX out of circuit C2 to connector 172 labeled R in. The signal can then be received by office repeater A, which is connected to connectors 172 circuit C2. In a similar fashion, connector 172 labeled T in of C1 is linked to connector 172 labeled T out of C2, connector 172 labeled R out of C1 is linked to connector 172 labeled R in of C2, and connector 172 labeled T out of C1 is linked to connector 172 labeled T in of C2.

Connectors 174 labeled TL of C1 and C2 are linked by patch cords 159 as well. Jack 155 is configured so that a patch cord inserted into jack 155 will be able to monitor electronic signals traveling between connectors 172 labeled T out and R out, and connectors 174 labeled TX out and RX out, without interrupting signal flow. The insertion of a patch cord into jack 155 of circuit C1 will provide a ground for the power circuit connected with signal lamp 152 of circuit C1, causing this lamp to light. The grounding of the power circuit to signal lamp 152 of circuit C1 also provides a ground for the connector 174 labeled TL of circuit C1. Connector 174 labeled TL of circuit C1 is in turn liked to connector 174 labeled TL of circuit C2, and will thus provide a ground for the power circuit connected with signal lamp 152 of circuit C2. Thus, if a monitor patch cord is inserted into jack 155 of either C1 or C2, signal lamps 152 of both C1 and C2 will be lit, allowing both ends of the cross-connected circuit to be identified.

Figure 19C:
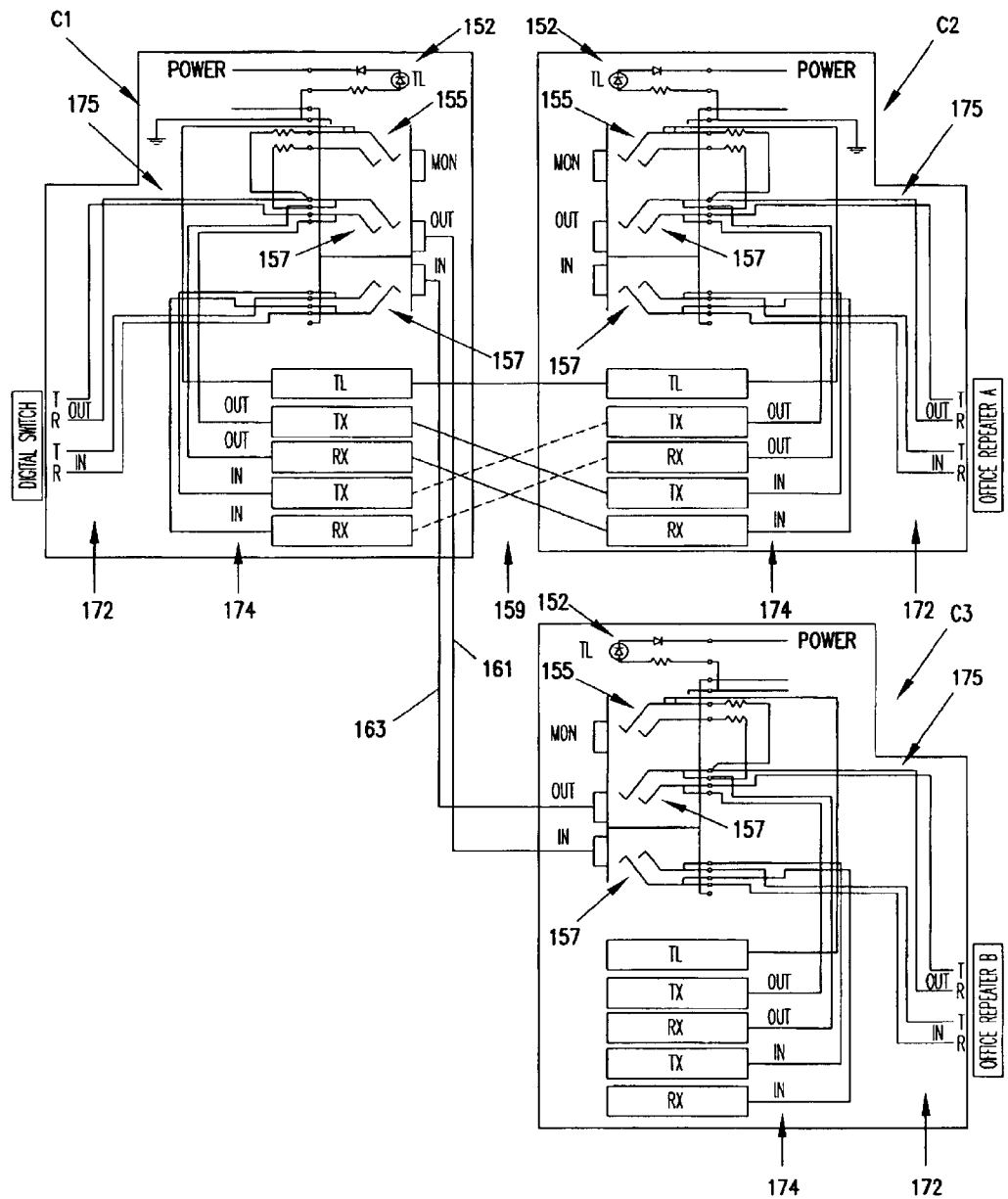
FIG. 19C is a schematic diagram of the use of the circuitry of FIG. 19A for patching a digital switch with a different office repeater.

Referring to FIG. 19C, a patching of between circuits 153 labeled C1 and C3 is shown. A patching between two circuits 153 that are not normally connected might be required if office repeater A, attached to circuit C2 fails or requires some maintenance and must be taken offline temporarily. The digital switch connected to circuit C1 must be tied to office repeater B during office repeater A's downtime. In this FIG, circuit C1 is the same as in FIG. 19B, with a digital switch connected to connectors 172 labeled R in, T in, R out and T out. Office repeater B is connected to connectors 172 of circuit C3 labeled R in, T in, R out and T out. A first end of a patch cord 161 is inserted into jack 157 labeled OUT of circuit C1, linking patch cord 161 by circuitry 175 to T out and R out of connectors 172 of circuit C1. The insertion of patch cord 161 into jack 157 also breaks the electronic connection between connectors 172 labeled T out and R out and connectors 174 labeled TX out and RX out. A second end of patch cord 161 is inserted into jack 157 labeled IN of circuit C3, linking patch cord 161 by circuitry 175 to T in and R in of connectors 172 of circuit C3, and thus to office repeater B. Similarly, a first end of a patch cord 163 is inserted into jack 157 labeled IN of circuit C1, linking patch cord 163 by circuitry 175 to T in and R in of connectors 172 of circuit C1. The insertion of patch cord 163 into jack 157 also breaks the electronic connection between connectors 172 labeled T in and R in and connectors 174 labeled TX in and RX in. A second end of patch cord 163 is inserted into jack 157 labeled OUT of circuit C3, linking patch cord 163 by circuitry 175 to T out and R out of connectors 172 of circuit C3, and thus to office repeater B.

These connectors 172 are linked electronically by circuitry with springs inside the monitor jack 155 mounted behind access opening 154 and two cross-connect jacks 157, one each behind access openings 156. Jacks 155 and 157 are sized and shaped to receive patch cord ends and make contact with conductors within the patch cord.

The springs within jack 155 are configured so that a patch cord inserted into jack 155 through access opening 154 will monitor any signals in the circuitry connecting the tip out and ring out connectors 172

The connectors shown in the FIGS. are wire wrap connectors. It is anticipated that a variety of other electronic connectors may be used along the connector planes. Below connectors 172 on one side of first connector plane 170 are posts 176 for connecting a power supply to module 11 and posts 178 for providing a grounding connection to module 11. Located on first connector plane 170, below second section 166, is a mounting ledge 184. The purpose of ledge 184 is to engage mounting lip 212 of module mount 10. Fasteners such as screws 28 can then be inserted through openings 214 in lip 212 and engage openings 185 in ledge 184.

Figure 23:
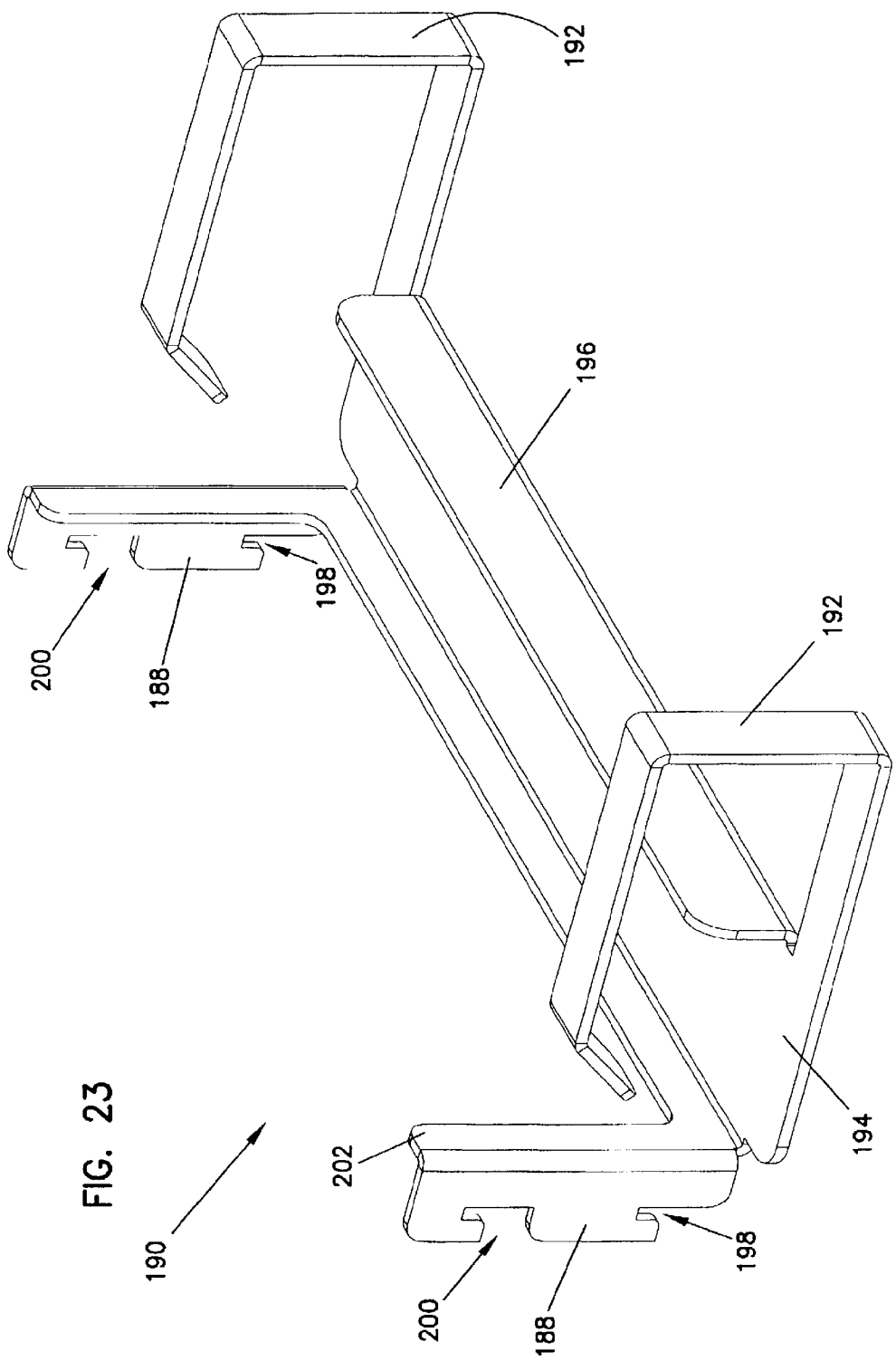
FIG. 23 is a rear perspective view of the jumper tray of FIG. 20.
Figure 24:
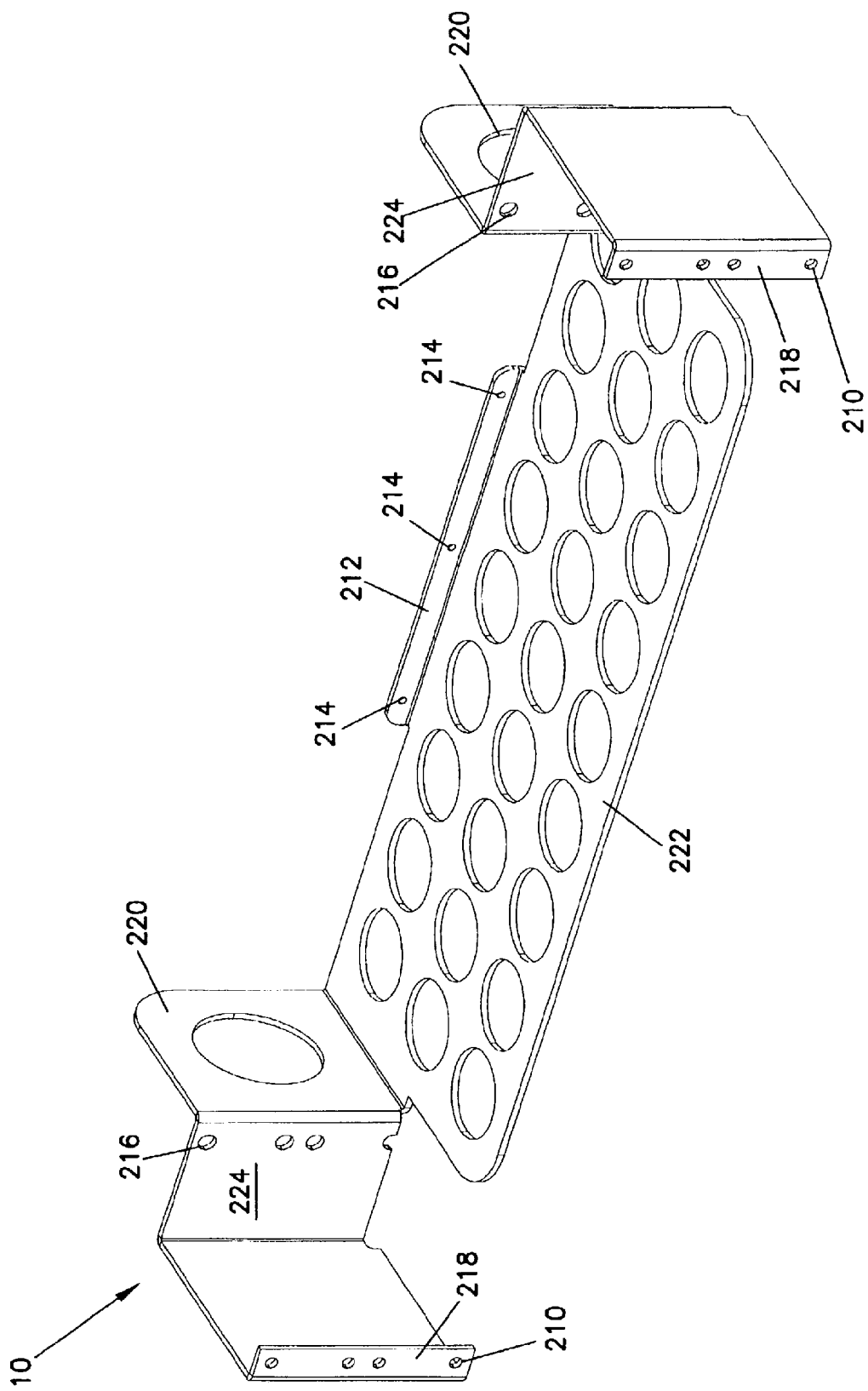
FIG. 24 is a front perspective view of a mount for installing telecommunications cross-connect modules in the rack of FIG. 1.
Figure 25:
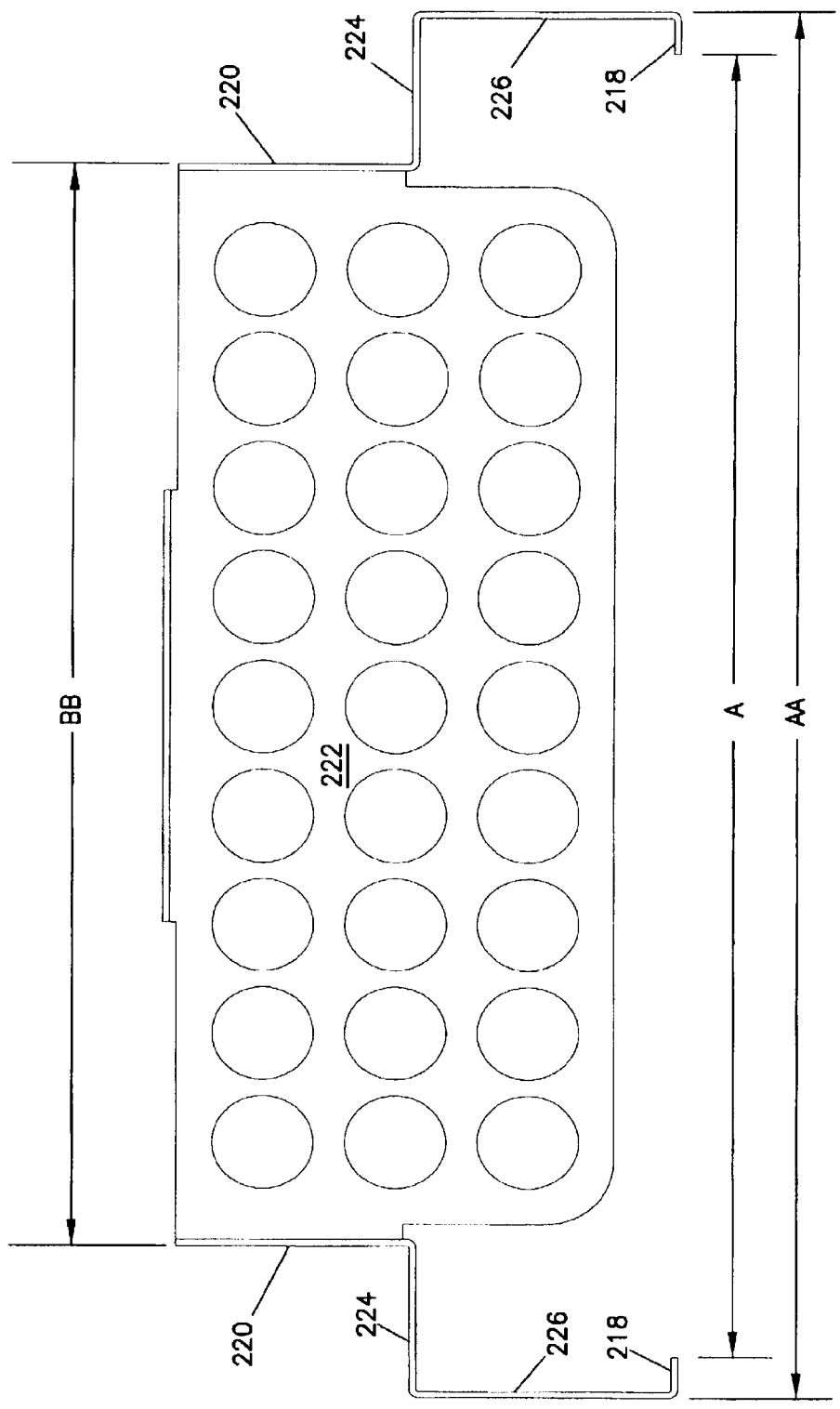
FIG. 25 is a top view of the mount of FIG. 24.
Figure 26:
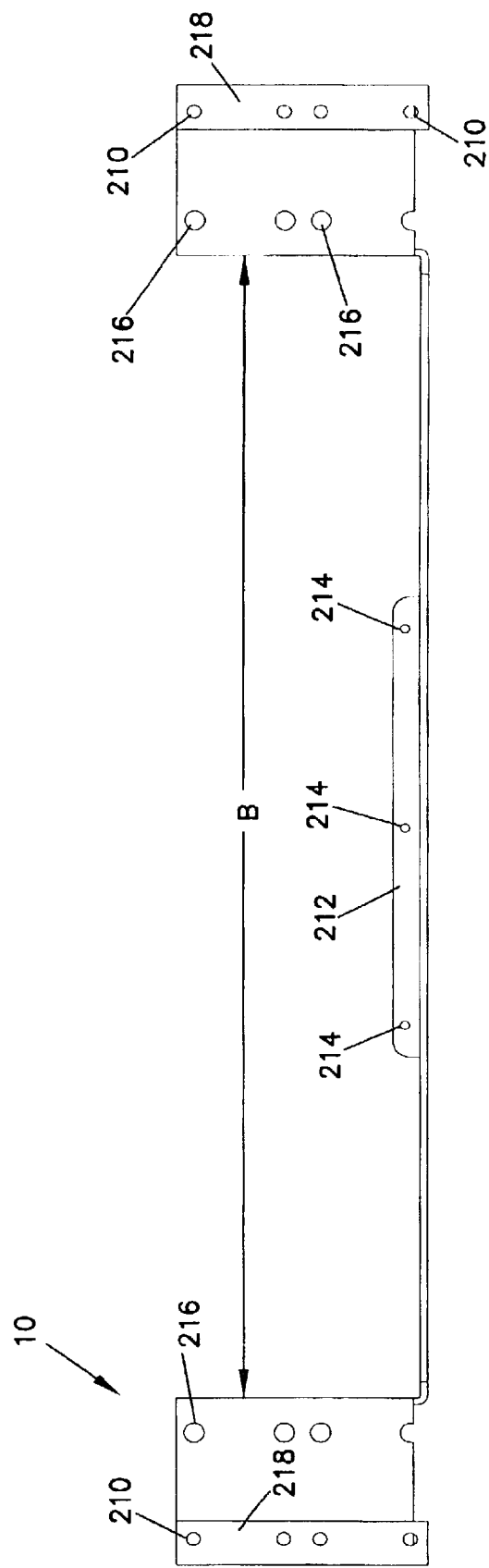
FIG. 26 is a front view of the mount of FIG. 24.

Referring now also to FIG. 23, mounted along sides 184 of second section 166, adjacent to second connector face 180, are jumper tray mounts 186. Mounts 186 pass though openings 200 in vertical extension 188 of jumper tray 190, slidably engage mounting slots 198. Slots 198 and mounting tabs 186 cooperate to securely hold jumper tray 186 to second connector plane 180 while still allowing tray 186 to be quickly and easily removed without requiring any tools. Jumper tray 186 also includes a mounting face 204 which sits flush against second connector plane 180 when tray 186 is mounted to module 11. Bottom 194 provides support to cables attached to connectors 174 and helps direct these cables into vertical cable channel 40 formed by vertical cable guides 12, where the cables are then directed up or down to cable troughs 14 or 16. Tray lip 196 is located at the rear of bottom 194 and helps prevent cables from accidentally sliding off the rear of bottom 194. Lip 196 also serves to separate cables linked to connectors 174 from other cross-connect jumper cables from other modules 11 within rack 1 that are held by cable rings 192.

Referring now to FIGS. 22 and 24 through 26, mounting module 10 for mounting modules 11 within rack 1 is shown. As shown in FIG. 1, a plurality of module mounts 10 are mounted to rack 1. Mounts 10 allow modules 11 to be mounted to the front of rack 1 despite modules 11 being wider than width BB. Mount 10 is defined by a bottom plate 222, a lip 212 at the rear of plate 222, sidewalls 220 and sidewalls 226, extension walls 224, and flanges 218 at the front of sidewall 226. Lip 212 includes mounting openings 214, extension walls 224 include mounting openings 216 and flanges 218 include mounting openings 210. Sidewalls 220 define an interior width slightly larger than B, allowing a module 11 to be inserted into mount 10 so that sidewalls 168 fit between sidewalls 220. Sidewalls 220 also define an exterior width slightly smaller than BB, allowing mount 11 to be inserted between vertical frame members 22 of rack 1. Sidewalls 226 define an exterior width substantially equal to AA, the overall width of rack 1. Flanges 218 define an interior width slightly greater than A, allowing a module 11 to be inserted into mount 10 so that sidewalls 167 fit between flanges 218.

To attach mount 10 to rack 1, mount 10 is held horizontally and positioned so that sidewalls 220 are between vertical frame members 22, with extension wall 224 positioned against the front of frame members 22. Fasteners such as screws 28 are then inserted through openings 216 in extension walls 224 so that screws 28 engage openings 20. A module 11 can then be mounted to mount 10. A module 11 is first inserted between flanges 218 and rested on bottom 222 until ledge 184 rests against lip 212. Mount 10 is sized so that rear wall 169 of front section 162 rests against extension wall 224 when ledge 184 rests against lip 212. Fasteners such as screws 28 are then inserted through openings 214 to engage openings 185, and also through openings 160 to engage openings 210.

Referring now to FIGS. 27 through 30, cross aisle panel 18 is shown. Cross aisle panels are used in a telecommunications installation when the installation includes racks mounted in different rows or aisles. When connecting equipment within the same row of racks, the cross-connection or jumper cables are placed within the cable management structures detailed above. However, this cable management system may not be desirable when dealing with cables which pass between equipment in different rows of racks. These inter-rack cables cross the aisle between the racks. The cross aisle panels are used to support these inter-rack connections.

As an example, an installation includes four rows of equipment racks with four racks in each row. One rack within each row is equipped with a cross aisle panel. Each cross aisle panel includes first connectors for cables from equipment mounted to racks within the row and second connectors electronically linked to the first connectors. These second connectors are connected via fixed cables to the second connectors in the other cross aisle panels of the other rows within the installation. When a first device mounted to a rack within the first row needs to be connected with a second device mounted to a rack in the second row, the first device is connected to a first connector set on the cross aisle panel first row. This first connector set is electronically linked to a second connector set in that panel which is in turn connected to a cable linked to a second connector set on the cross aisle panel of the second row. This second connector set in the second row is linked electronically to a first connector set on the cross aisle panel of the second row. Cables are then used to connect the first connector set of the cross aisle panel of the second row to the second device. A cross aisle panel allows these sorts of connections to be made without the need for especially long jumper cables to span the aisles between rows of racks and avoids the cable management problems such long cross aisle cabling might present.

Figure 27:
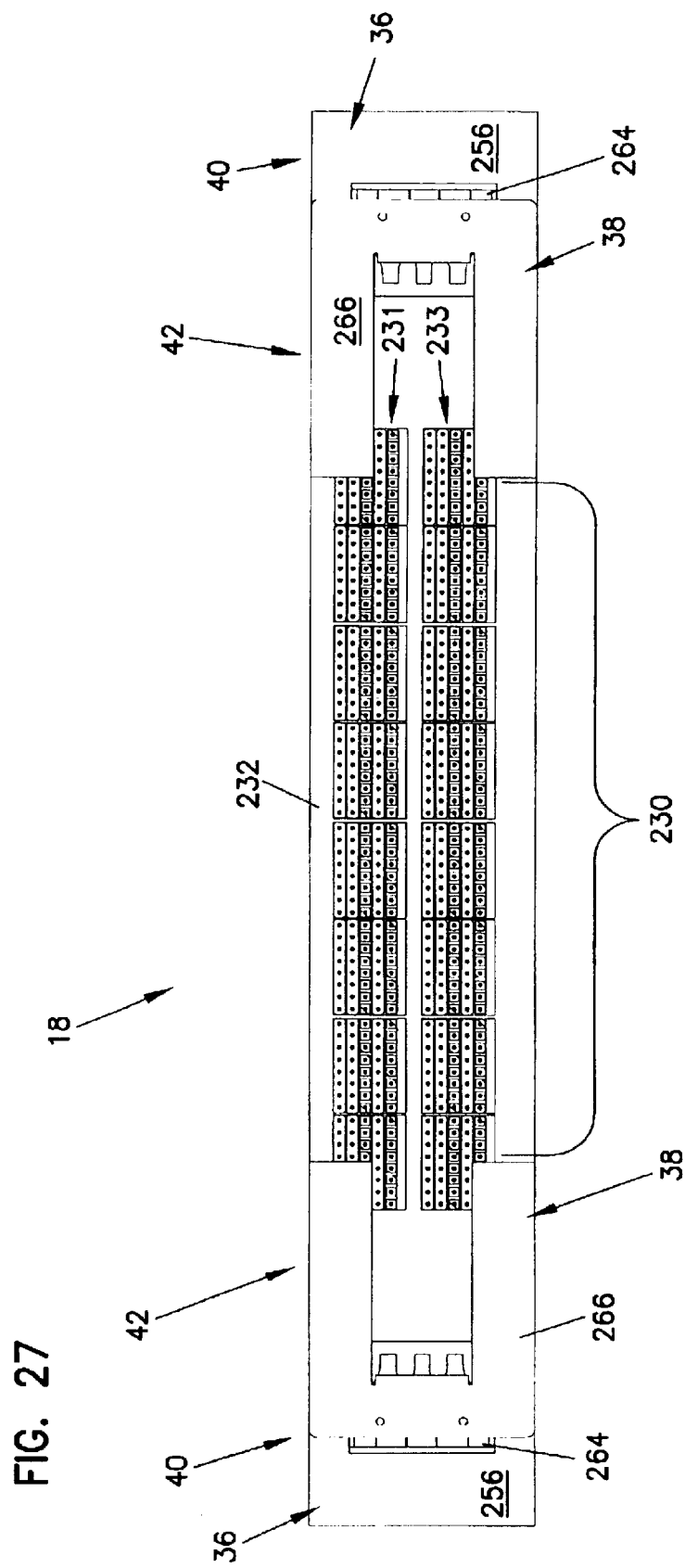
FIG. 27 is a rear view of the cross aisle panel of FIGS. 1 and 3.
Figure 28:
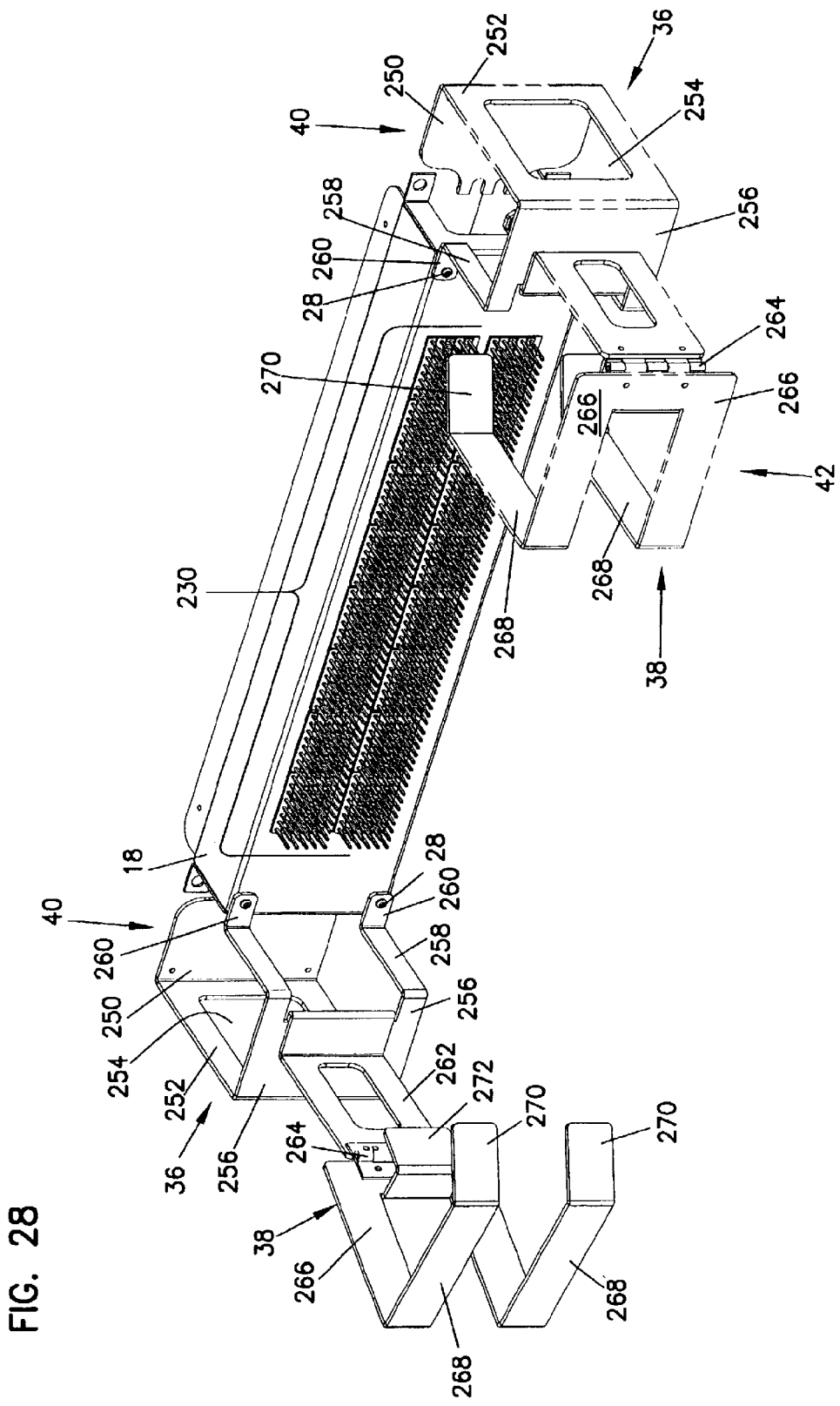
FIG. 28 is a rear perspective view of the cross aisle panel of FIG. 27.
Figure 29:
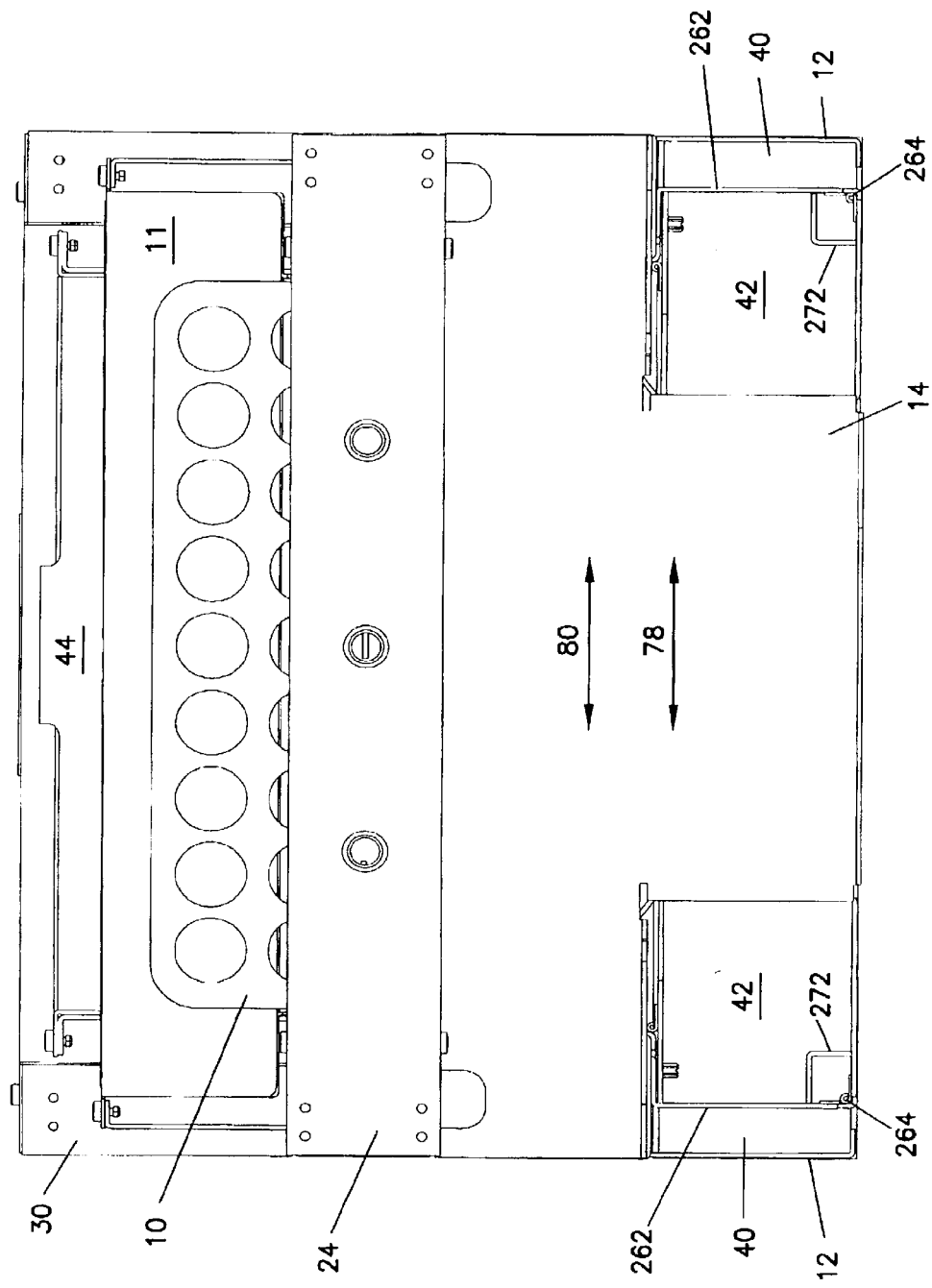
FIG. 29 is a top view of the rack of FIG. 1.
Figure 30:
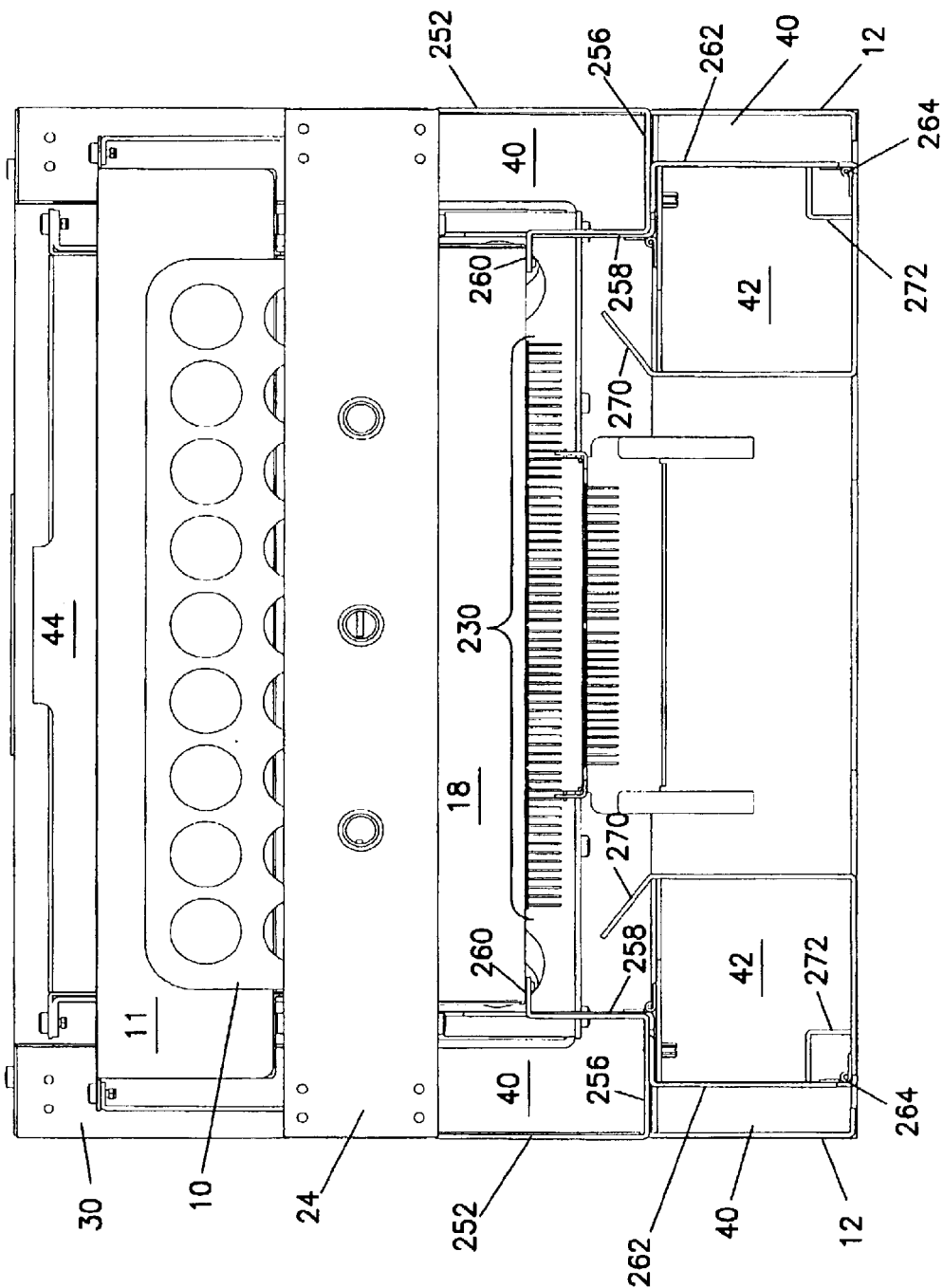
FIG. 30 is a top view of the rack of FIG. 1 with the upper trough removed and a cross-connect module installed as shown in FIG. 17.

FIG. 27 is a rear view of the cross aisle panel 18 showing the general position of brackets 36 and 38 with relation to the connectors 230 on a rear face 232 of panel 18. Brackets 36 and 38 are generally the same height of cross aisle panel 18 and serve as the upper extensions of vertical cable channels 40 and 42. Referring now to FIG. 28, bracket 36 includes a front wall 250, an outside wall 252 with cable opening 254, a rear wall 256, and an inside wall 258 with mounting tabs 260 for mounting bracket 36 to cross aisle panel 18 with fasteners such as screws 28. As shown in FIG. 30, bracket 36 is generally the same size and shape of the rear portion of vertical cable channel 40, as defined by vertical cable guides 12. Cable openings 254 allow cables to be passed into and out of vertical cableway 40.

Referring again to FIG. 28, part of rear wall 256 of bracket 36 is fixed wall 262 of bracket 38. The movable part of extension 38 is movable between a closed position, as shown on the right side of FIG. 28, and an open position, as shown on the left side of FIG. 28. Fixed wall 262 is an integral part of rear wall 256. Alternatively, rear wall 256 can be formed without an extension forming fixed wall 262 and fixed wall 262 can be formed as a separate part attached to rear wall 256 via spot welding or some other method. Mounted to the rear end of fixed wall 262 is hinge 264. Hinge 264 provides a movable linkage for the movable portion of bracket 38, including rear walls 266, inner walls 268, extensions 270 located at the ends of inner walls 268 and hinge stops 272. As shown in FIG. 30, bracket 38 is generally the same size and shape of vertical cableway 42 defined by vertical cable guides 12.

Hinge stops 272 serve to keep cables within vertical cableway 42 from interfering with hinge 264 when bracket 38 is moved and also serve to provide a closure stop. Hinge stop 272 is sized and shaped to rest against fixed wall 262 when the movable portion of bracket 38 is in the closed position, preventing bracket 38 from being closed so far as to partially occlude the entrance to vertical cableway 42.

Movement of bracket 38 is desirable due to the width of the connector field 230 on rear face 232 of cross aisle panel 18. As shown in FIG. 27, when brackets 38 are in a closed position, access to the outermost connectors 230 is obscured by brackets 38. On rear face 232, connectors 230 are arrayed in sixty-four vertical columns, with each column having two groups of five connectors 230, an upper group 231 and a lower group 233. Wire wrap connectors are shown for connectors 230 but other connector types are anticipated, provided the density of connections is maintained at a high enough level.

Figure 31:
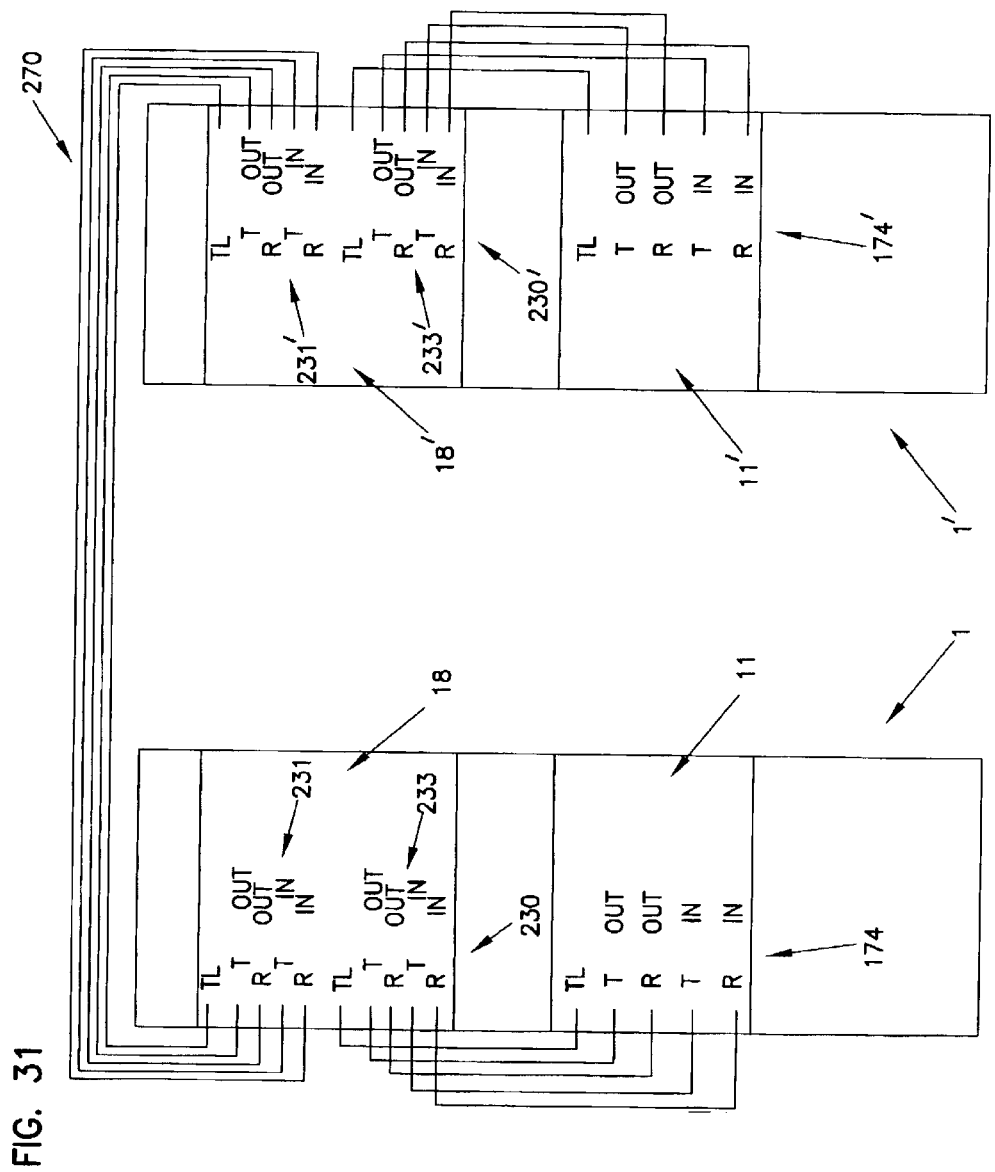
FIG. 31 is a schematic view of the use of a cross aisle panel to link cross-connect modules in different equipment racks.

Referring now to FIG. 31, upper group connectors 231 and lower group connectors 233 in the same vertical column are connected with each other as follows. Lower group connectors 233 include connectors designated TL, T out, R out, T in and R in. Lower group connectors 233 are connected with the TL, T out, R out, T in and R in connectors 174, respectively, of a module 11. Upper group connectors 231 include connectors designated TL, T out, R out, T in and R in. Upper group connectors 231 are linked electronically by circuitry within cross aisle panel 18 to lower group connectors 231 with the same designation. Cross aisle cabling 270 is then used to connect upper group connectors 231 of a first cross aisle panel 18 mounted in a first rack 1 with upper group connectors 231' in a second cross aisle panel 18' mounted in a second rack 1'. At the second rack 1', the connection between lower group connectors 233' and connectors 174' of module 11' are crossed for the tip and ring connections. The T out of group 233' is connected to the T in of connectors 174'; the R out of group 233' is connected to the R in of connectors 174'; the T in of group 233' is connected to T out of connectors 174'; and the R in of group 233' is connected to the R out of connectors 174'. The TL of group 233' is connected with the TL of connectors 174'.

Having described preferred aspects and embodiments of the present invention, modifications and equivalents of the disclosed concepts may readily occur to one skilled in the art. However, it is intended that such modifications and equivalents be included within the scope of the claims which are hereto appended.

What is claimed is as follows:

1. A cross aisle connection panel comprising:
 a housing with a top and a bottom, a first and second opposed sides and first and second opposed ends defining an enclosed interior;
 a plurality of input connectors on the first side;
 a plurality of output connectors on the first side electronically connected with the plurality of input connectors;
 a first cable bracket mounted at each opposed end; and
 a second cable bracket mounted at each opposed end;
 wherein the second cable bracket is hingedly mounted about a vertical axis and movable between a first and second position;
 wherein the second cable brackets cover only a portion of the input and output connectors on the first side when in the first position, the remaining input and output connectors on the first side not covered by either of the second cable brackets; and
 wherein the covered input and output connectors are exposed when the second cable bracket is in the second position.

2. The cross aisle panel of claim 1, wherein the housing includes mounting flanges at each end for mounting the panel to a telecommunications equipment rack and the housing and cable brackets are sized and shaped to fit within a telecommunications rack.

3. The cross aisle panel of claim 1, wherein the second cable bracket is hingedly mounted to the first cable bracket.

4. A telecommunications rack comprising:
 a base having a first side and opposing second side;
 a first vertical frame member having a top and a bottom, the bottom being attached to the first side;
 a second vertical frame member having a top and a bottom, the bottom being attached to the second side;
 a top connecting the top of the first vertical frame member with the top of the second vertical frame member;
 a cross aisle panel mounted to the vertical frame members, the cross aisle panel including:
  a housing with first and second opposing ends:
  a faceplate including a plurality of input connectors on a first side of the faceplate;
  a plurality of output connectors on the first side electronically connected to the plurality of input connectors;
  a first fixed cable bracket mounted at each opposing end, each first cable bracket defining a first vertical cable channel at each end; and
  a second movable cable bracket mounted at each opposing end, each second cable bracket defining a second vertical cable channel at each end;
  wherein the second cable bracket is hingedly mounted about a vertical axis and movable between a first and second position;
  wherein the first and second cable channels at each end are segregated from each other, and vertical cable channels at the first end are segregated from the vertical cable channels of the second end;
  wherein the second cable bracket covers at least some of the input and output connectors on the first side when in the first position; and
  wherein the covered input and output connectors are exposed when the second cable bracket is in the second position.

5. The telecommunications rack of claim 4, wherein the rack includes a plurality of vertical cable guides aligned with each of the first vertical cable channels.

6. The telecommunications rack of claim 5, wherein the rack includes a plurality of vertical cable guides aligned with each of the second vertical cable channels.

* * * * *